(12) United States Patent
Chang et al.

(10) Patent No.: US 9,223,583 B2
(45) Date of Patent: *Dec. 29, 2015

(54) PROACTIVE TOKEN RENEWAL AND MANAGEMENT IN SECURE CONVERSATIONS

(75) Inventors: Symon Szu-yuan Chang, Fremont, CA (US); Adam Lee, Beijing (CN); Thorick Chow, El Cerrito, CA (US); Alan Mullendore, Alameda, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 536 days.

This patent is subject to a terminal disclaimer.

(21) Appl. No.: 13/190,266

(22) Filed: Jul. 25, 2011

(65) Prior Publication Data

US 2012/0159140 A1 Jun. 21, 2012

Related U.S. Application Data

(60) Provisional application No. 61/424,353, filed on Dec. 17, 2010.

(51) Int. Cl.
*G06F 9/00* (2006.01)
*G06F 9/44* (2006.01)
*H04L 29/06* (2006.01)

(52) U.S. Cl.
CPC ............ *G06F 9/4401* (2013.01); *H04L 63/068* (2013.01)

(58) Field of Classification Search
CPC ............................ G06F 9/4401; H04L 63/068
USPC ................. 713/155, 172; 714/56; 726/3, 4, 6; 370/252, 498, 331, 230

See application file for complete search history.

(56) References Cited

U.S. PATENT DOCUMENTS

| 6,748,559 | B1 * | 6/2004 | Pfister et al. ..................... 714/56 |
| 8,010,783 | B1 * | 8/2011 | Cahill ............................ 713/155 |
| 8,631,238 | B2 | 1/2014 | Chang et al. |

(Continued)

FOREIGN PATENT DOCUMENTS

WO    WO 2010090569 A1 *   8/2010

OTHER PUBLICATIONS

D. Hercog, Timer expiration time of selective repeat protocol, Sep. 2009, vol. 45 No. 20, Pages attached.*

(Continued)

*Primary Examiner* — Thomas Lee
*Assistant Examiner* — Aurel Prifti
(74) *Attorney, Agent, or Firm* — Kilpatrick Townsend & Stockton LLP

(57) ABSTRACT

The present invention relates to methods and systems for method of implementing proactive token renewal and management in secure conversations. The method includes transmitting an secure conversation token (SCT) bootstrap request, receiving a first SCT in response to the SCT bootstrap request, and determining a round trip time (RTT) of the SCT bootstrap request. The method further includes determining the expiration time of the first SCT, based on the combination of the RTT and the expiration of the first SCT, scheduling an SCT renew request, and initiating the SCT renew request. Further, the method includes receiving a second SCT in response to the SCT renew request, receiving an indication that the first SCT has expired, and in response to the indicating, utilizing the second SCT.

18 Claims, 22 Drawing Sheets

(56) References Cited

U.S. PATENT DOCUMENTS

| | | | |
|---|---|---|---|
| 2004/0073690 A1* | 4/2004 | Hepworth et al. | 709/230 |
| 2004/0260831 A1* | 12/2004 | Dyck et al. | 709/233 |
| 2006/0041677 A1* | 2/2006 | Sturrock et al. | 709/232 |
| 2006/0075110 A1* | 4/2006 | Seraphin | 709/227 |
| 2007/0094503 A1* | 4/2007 | Ramakrishna | 713/172 |
| 2007/0115845 A1* | 5/2007 | Hochwarth et al. | 370/252 |
| 2007/0124587 A1 | 5/2007 | Krishnamurthi et al. | |
| 2007/0230337 A1* | 10/2007 | Igarashi et al. | 370/230 |
| 2007/0255766 A1* | 11/2007 | Di Giglio et al. | 707/204 |
| 2008/0123597 A1* | 5/2008 | Arbol et al. | 370/331 |
| 2008/0232405 A1* | 9/2008 | Gallo | 370/498 |
| 2009/0187975 A1* | 7/2009 | Edwards et al. | 726/4 |
| 2010/0235897 A1* | 9/2010 | Mason et al. | 726/7 |
| 2010/0329127 A1* | 12/2010 | Pirozzi | 370/242 |
| 2011/0010539 A1* | 1/2011 | Salomone | 713/155 |
| 2011/0106940 A1* | 5/2011 | Chauvin et al. | 709/224 |
| 2011/0185010 A1* | 7/2011 | Shatsky et al. | 709/203 |
| 2011/0264808 A1* | 10/2011 | Eriksson | 709/227 |
| 2012/0159162 A1 | 6/2012 | Chang et al. | |
| 2013/0042301 A1* | 2/2013 | Mahamuni et al. | 726/3 |

OTHER PUBLICATIONS

Anderson et al., "WS-SecureConversation 1.3," OASIS, retrieved Nov. 9, 2011 from http://docs.oasis-open.org/ws-sx/ws-secureconversation/200512/ws-secureconversation-1.3-os.html, Mar. 1, 2007, 47 pages.

U.S. Appl. No. 13/190,273, filed Jul. 25, 2011, Non-Final Office Action mailed on Mar. 11, 2013, 29 pages.

U.S. Appl. No. 13/190,273, Notice of Allowance mailed on Sep. 12, 2013, 11 pages.

* cited by examiner

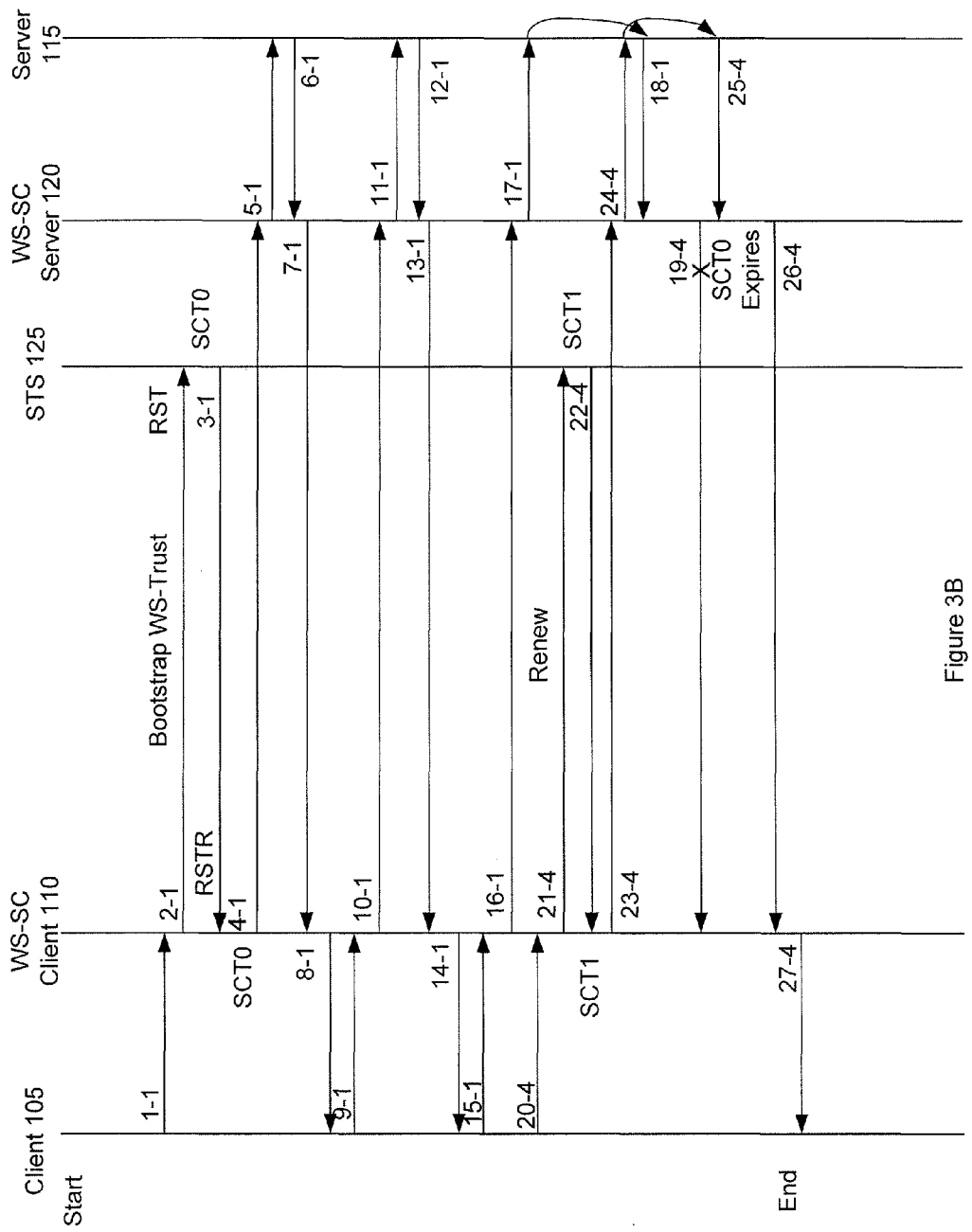

US 9,223,583 B2

PROACTIVE TOKEN RENEWAL AND MANAGEMENT IN SECURE CONVERSATIONS

RELATED APPLICATION

This application claims priority to U.S. Patent Application No. 61/424,353, filed Dec. 17, 2010, entitled "PROACTIVE TOKEN RENEWAL AND MANAGEMENT IN SECURE CONVERSATIONS" which incorporated in its entirety for all purpose. This application is related to U.S. patent application Ser. No. 13/190,273, filed Jul. 25, 2011, entitled PREVENTING RACE CONDITIONS IN SECURE TOKEN EXCHANGE, which is incorporated by reverence in its entirety for any and all purposes.

BACKGROUND OF THE INVENTION

This invention relates generally to security. More specifically the invention relates to high-performance web services secure conversation.

Presently, many error conditions in Web Services-Secure Conversation (WS-SC) exist on the management of Secure Conversation Tokens (SCT). Current implementations of WS-SC are unable to handle heavy traffic load, especially when handling the SCT bootstrap, SCT cancel, and SCT renew.

Further, in WS-SC conversations between the client and the server are protected by the SCT. The SCT is a share secret that is generated by the Secure Token Service (STS) on the server side, exchanged with a WS-Trust bootstrap message, and this shared secret in maintained at the client and the server. When the SCT is expired, the client sends a SCT renew request message, and new SCT will be used to protect the subsequent conversation messages between the client and the server. Both client and server will reject a message if an expired SCT is used to protect the message. As such, in a heavy message load conditions the conversation messages exchange and the SCT renew will not be synchronized. So, there will be some race conditions where the SCT on both sides will be out-of-sync, multiple bootstraps or renew message exchanges will happen, and some expired SCT will cause message failures.

Thus, the following considerations should be made. Synchronized and asynchronize messages exchange between client and service. A combination of stacks where the WS-SC may combine with other Web Services protocols, such as WS-ReliableMessage (WS-RM) and/or WS-MakeConnections (WS-MC). Cluster environment where many servers work together as computer cluster to serve WS conversations concurrently. Interoperability where the client or sever may be from other vendors without any direct control over the behavior. Security which needs to be distinct with regard to the good protected messages and invalid messages during the run-time on security policy enforcement. Hence, these and other shortcomings in the art are remedied by the present invention.

BRIEF DESCRIPTION OF THE DRAWINGS

The present invention is described in conjunction with the appended figures.

Figure 1A:
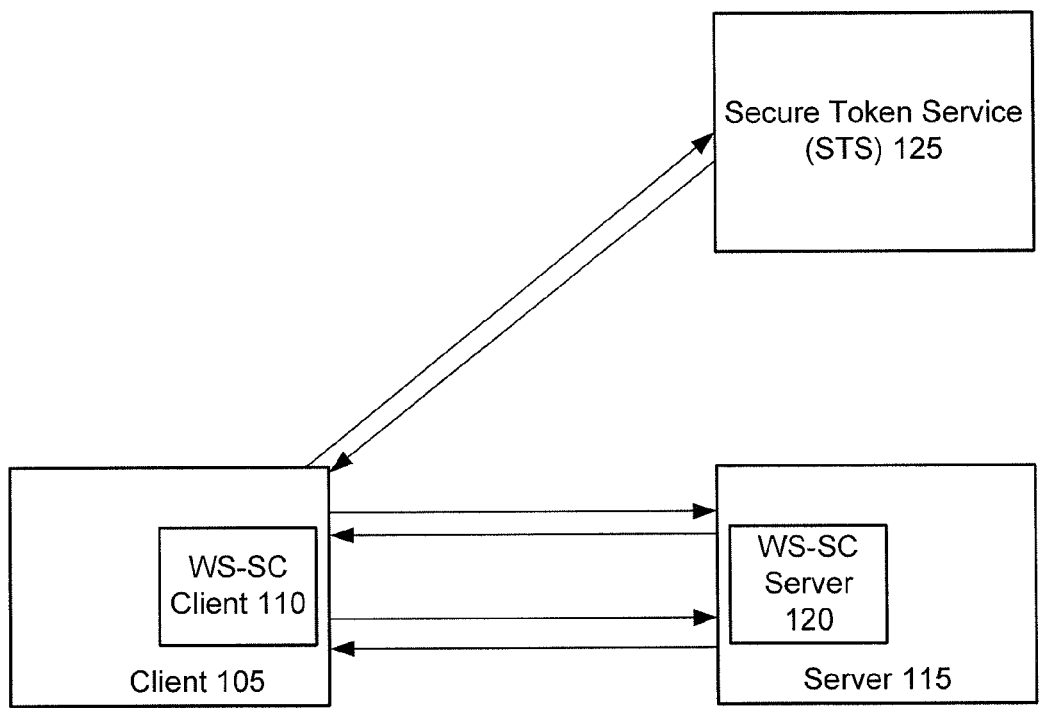
FIG. 1A is a system diagram for implementing aspects of the present invention.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

SUMMARY OF THE INVENTION

One embodiment describes a method of implementing proactive token renewal and management in secure conversations. The method includes transmitting an secure conversation token (SCT) bootstrap request, receiving a first SCT in response to the SCT bootstrap request, and determining a round trip time (RTT) of the SCT bootstrap request. The method further includes determining the expiration time of the first SCT, based on the combination of the RTT and the expiration of the first SCT, scheduling an SCT renew request, and initiating the SCT renew request. Further, the method includes receiving a second SCT in response to the SCT renew request, receiving an indication that the first SCT has expired, and in response to the indicating, utilizing the second SCT.

The method further includes receiving an indication that the first SCT is unexpired, in response to receiving the indication that the first SCT is unexpired, continuing to utilize the first SCT, and determining a constant to buffer the expiration and the RTT in order to avoid expiration of the first SCT. Further, the utilizing of the second SCT comprises encrypting messages transmitted between a client and a server, and the initiating of the SCT renew request is configured to proactively renewed with the second SCT prior to the expiration of the first SCT.

Furthermore, at least one SCT is continuously unexpired. The method further includes multiplying the RTT by a factor value, wherein the factor value is configured to provide an overlap between the expiration of the first SCT and the renewal of the second SCT.

In a further embodiment, a system for implementing proactive token renewal and management in secure conversations, is described. The system includes a memory device and a processor in communication with the memory device. The memory device includes sets of instructions stored thereon which, when executed by the processor, cause the processor to: transmit an secure conversation token (SCT) bootstrap request, receive a first SCT in response to the SCT bootstrap request, and determine a round trip time (RTT) of the SCT bootstrap request. The sets of instructions further cause the processor to determine the expiration time of the first SCT, based on the combination of the RTT and the expiration of the first SCT, schedule an SCT renew request, and initiate the SCT renew request. Furthermore, the sets of instructions cause the processor to receive a second SCT in response to the SCT renew request, receive an indication that the first SCT has expired, and in response to the indicating, utilize the second SCT.

In yet another embodiment, a computer-readable medium for implementing proactive token renewal and management in secure conversations. The computer-readable medium includes instructions for transmitting an secure conversation token (SCT) bootstrap request, receiving a first SCT in response to the SCT bootstrap request, and determining a round trip time (RTT) of the SCT bootstrap request. The computer-readable medium further includes instructions for determining the expiration time of the first SCT, based on the combination of the RTT and the expiration of the first SCT, scheduling an SCT renew request, and initiating the SCT renew request. Further, The computer-readable medium includes instructions for receiving a second SCT in response to the SCT renew request, receiving an indication that the first SCT has expired, and in response to the indicating, utilizing the second SCT.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other elements in the invention may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Aspects of the present invention include solutions to increase the performance of the WS-SC secure conversation solution for an enterprise environment.

Turning now to FIG. 1A, which illustrates a message exchange flow. The message exchange is between a service requester (client 105) and a service provider (server 115). The secure token service (STS) 125 may be co-located with the server 115. Furthermore, the client 105 may include a WS-SC client 110 and the server 115 may include a WS-SC server 120.

In one embodiment, the WS-SC client 110 may initiate a WS-SC bootstrap request to the STS 125. The WS-SC bootstrap request may use UNT or X509 type tokens to exchange the secure conversation token (SCT). Upon receipt of the WS-SC bootstrap request, the STS 125 sends a WS-SC bootstrap response with SCT to the WS-SC client 110. Furthermore, the WS-SC client 110 initiates a WS-SC request message to the WS-SC server which is protected by SCT. Furthermore, the WS-SC response messages sent from the WS-SC server 120 to the WS-SC client 110 are also protected by SCT.

In a further embodiment, the SCT expires (i.e., after a certain amount of time), and as such it is determined that a WS-Trust renew request security token (RST) to renew SCT is necessary. The WS-SC client 110 initiates the RST and sends it to the WS-SC server 120. Then, the WS-SC server 120 sends a WS-Trust renew response STR (RSTR) to the WS-SC client 110 with the new SCT. Accordingly, messages sent between the client 105 and the server 115 are protected with the new SCT, until that SCT expires, and a new SCT is established. Furthermore, other message exchanges, including cancel requests and responses may also be transmitted between the client 105 and the server 115 in the same manner.

In one embodiment, Table 1 in an example RSTR which shows the content of a SCT:

TABLE 1

```
<wst:RequestSecurityTokenResponseCollection>
    <wst:RequestSecurityTokenResponse>
        <wst:TokenType>http://docs.oasis-open.org/ws-sx/ws-secureconversation/200512/sct</wst:TokenType>
        <wsp:AppliesTo>
            <wsa:EndpointReference>
                <wsa:Address>http://localhost:7001/partnerservice/partnerservice</wsa:Address>
            </wsa:EndpointReference>
        </wsp:AppliesTo>
        <wst:Entropy>
            <wst:BinarySecret Type="http://docs.oasis-open.org/ws-sx/ws-trust/200512/Nonce">43+aiZNMqLHJyxzOcwwiaA==</wst:BinarySecret>
        </wst:Entropy>
        <wst:Lifetime>
            <wsu:Created>2009-10-18T08:02:59.849Z</wsu:Created>
            <wsu:Expires>2009-10-18T08:03:59.849Z</wsu:Expires>
        </wst:Lifetime>
        <wst:KeySize>256</wst:KeySize>
        <wst:RequestType>http://docs.oasis-open.org/ws-sx/ws-trust/200512/Issue</wst:RequestType>
        <wst:RequestedSecurityToken>
            <wsc:SecurityContextToken xmlns:wsc="http://docs.oasis-open.org/ws-sx/ws-secureconversation/200512" wsu:Id="QiezR0sXAvtYBGrv">
                <wsc:Identifier>uuid:myserver:f0ed2a6d7fb07688:13e3216c:12466a879bd:-7fff</wsc:Identifier>
            </wsc:SecurityContextToken>
        </wst:RequestedSecurityToken>
        <wst:RequestedProofToken>
            <wst:ComputedKey>http://docs.oasis-open.org/ws-sx/ws-trust/200512/CK/PSHA К</wst:ComputedKey>
        </wst:RequestedProofToken>
    </wst:RequestSecurityTokenResponse>
</wst:RequestSecurityTokenResponseCollection>
```

Table 2 shows a sample WS-SC request message which shows how the SCT is used in the request:

TABLE 2

```
<env:Envelope xmlns:env="http://schemas.xmlsoap.org/soap/envelope/">
    <env:Header>
        <wsse:Security xmlns:wsse="http://docs.oasis-open.org/wss/2004/01/oasis-200401-wss-wssecurity-secext-1.0.xsd" env:mustUnderstand="1">
            <wsc:SecurityContextToken xmlns:wsc="http://docs.oasis-open.org/ws-sx/ws-secureconversation/200512" xmlns:wsu="http://docs.oasis-open.org/wss/2004/01/oasis-200401-wss-wssecurity-utility-1.0.xsd" wsu:Id="QiezR0sXAvtYBGrv">
                <wsc:Identifier>uuid:myserver:f0ed2a6d7fb07688:13e3216c:12466a879bd:-7fff</wsc:Identifier>
            </wsc:SecurityContextToken>
            <wsc:DerivedKeyToken xmlns:wsc="http://docs.oasis-open.org/ws-sx/ws-secureconversation/200512" Algorithm="http://docs.oasis-open.org/ws-sx/ws-secureconversation/200512/dk/p_sha1" xmlns:wsu="http://docs.oasis-open.org/wss/2004/01/oasis-200401-wss-wssecurity-utility-1.0.xsd" wsu:Id="Tjpw87wHqaHgab34">
                <wsse:SecurityTokenReference xmlns:wsse="http://docs.oasis-open.org/wss/2004/01/oasis-200401-wss-wssecurity-secext-1.0.xsd" wsu:Id="str_z2iXPmm1Xk57L2f8" xmlns:wsu="http://docs.oasis-open.org/wss/2004/01/oasis-200401-wss-wssecurity-utility-1.0.xsd" wsse11:TokenType="http://docs.oasis-open.org/ws-sx/ws-secureconversation/200512/sct" xmlns:wsse11="http://docs.oasis-open.org/wss/oasis-wss-wssecurity-secext-1.1.xsd">
                    <wsse:Reference ValueType="http://docs.oasis-open.org/ws-sx/ws-secureconversation/200512/sct" URI="uuid:myserver:f0ed2a6d7fb07688:13e3216c:12466a879bd:-7fff"/>
                </wsse:SecurityTokenReference>
                <wsc:Generation>0</wsc:Generation>
                <wsc:Length>32</wsc:Length>
                <wsc:Label>WS-SecureConversationWS-SecureConversation</wsc:Label>
                <wsc:Nonce>2pXrfzHxq4dnuwPmEQCGbg==</wsc:Nonce>
            </wsc:DerivedKeyToken>
            <n1:ReferenceList xmlns:n1="http://www.w3.org/2001/04/xmlenc#">
                <n1:DataReference URI="#jlDe2p1EvtmE7vWK"/>
            </n1:ReferenceList>
            <wsc:DerivedKeyToken xmlns:wsc="http://docs.oasis-open.org/ws-sx/ws-secureconversation/200512" Algorithm="http://docs.oasis-open.org/ws-sx/ws-secureconversation/200512/dk/p_sha1" xmlns:wsu="http://docs.oasis-open.org/wss/2004/01/oasis-200401-wss-wssecurity-utility-1.0.xsd" wsu:Id="CcF2PveMNORO0can">
                <wsse:SecurityTokenReference xmlns:wsse="http://docs.oasis-open.org/wss/2004/01/oasis-200401-wss-wssecurity-secext-1.0.xsd" wsu:Id="str_aShiZWt2As1hX26e" xmlns:wsu="http://docs.oasis-open.org/wss/2004/01/oasis-200401-wss-wssecurity-utility-1.0.xsd" wsse11:TokenType="http://docs.oasis-open.org/ws-sx/ws-secureconversation/200512/sct" xmlns:wsse11="http://docs.oasis-open.org/wss/oasis-wss-wssecurity-secext-1.1.xsd">
                    <wsse:Reference ValueType="http://docs.oasis-open.org/ws-sx/ws-secureconversation/200512/sct" URI="uuid:myserver:f0ed2a6d7fb07688:13e3216c:12466a879bd:-7fff"/>
                </wsse:SecurityTokenReference>
                <wsc:Generation>0</wsc:Generation>
```

TABLE 2-continued

```
                    <wsc:Length>32</wsc:Length>
                    <wsc:Label>WS-SecureConversationWS-SecureConversation</wsc:Label>
                    <wsc:Nonce>Pei2RliOAasvysP647Ejzw==</wsc:Nonce>
                </wsc:DerivedKeyToken>
                <dsig:Signature xmlns:dsig="http://www.w3.org/2000/09/xmldsig#">
                    <dsig:SignedInfo>
                        <dsig:CanonicalizationMethod Algorithm="http://www.w3.org/2001/10/xml-exc-c14n#"/>
                        <dsig:SignatureMethod Algorithm="http://www.w3.org/2000/09/xmldsig#hmac-sha1"/>
                        <dsig:Reference URI="#Timestamp__fmK9GnEuj5Qplaql">
                            <dsig:Transforms>
                                <dsig:Transform Algorithm="http://www.w3.org/2001/10/xml-exc-c14n#"/>
                            </dsig:Transforms>
                            <dsig:DigestMethod Algorithm="http://www.w3.org/2000/09/xmldsig#sha1"/>
    <dsig:DigestValue>E/1RPKYcxkxTBesWSalIbQ5TJqc=</dsig:DigestValue>
                        </dsig:Reference>
                        <dsig:Reference URI="#Body__5C0A91dFL3f6bVEY">
                            <dsig:Transforms>
                                <dsig:Transform Algorithm="http://www.w3.org/2001/10/xml-exc-c14n#"/>
                            </dsig:Transforms>
                            <dsig:DigestMethod Algorithm="http://www.w3.org/2000/09/xmldsig#sha1"/>
    <dsig:DigestValue>WtHRo2eIzMX+O/xxISnYKuIxC5k=</dsig:DigestValue>
                        </dsig:Reference>
                        <dsig:Reference URI="#CcF2PveMNORO0can">
                            <dsig:Transforms>
                                <dsig:Transform Algorithm="http://www.w3.org/2001/10/xml-exc-c14n#"/>
                            </dsig:Transforms>
                            <dsig:DigestMethod Algorithm="http://www.w3.org/2000/09/xmldsig#sha1"/>
    <dsig:DigestValue>VdkLTPtJWK6g1L3XY1zHrL6SjqA=</dsig:DigestValue>
                        </dsig:Reference>
                    </dsig:SignedInfo>
                    <dsig:SignatureValue>+JMBjB9ljSQafUq6kE/fTo5SzK8=</dsig:SignatureValue>
                    <dsig:KeyInfo>
                        <wsse:SecurityTokenReference xmlns:wsse="http://docs.oasis-open.org/wss/2004/01/oasis-200401-wss-wssecurity-secext-1.0.xsd" xmlns:wsse11="http://docs.oasis-open.org/wss/oasis-wss-wssecurity-secext-1.1.xsd" xmlns:wsu="http://docs.oasis-open.org/wss/2004/01/oasis-200401-wss-wssecurity-utility-1.0.xsd" wsse11:TokenType="http://docs.oasis-open.org/ws-sx/ws-secureconversation/200512/dk" wsu:Id="str__HWhZ7NqfWyyO2FUK">
                            <wsse:ReferenceURI="#CcF2PveMNORO0can" ValueType="http://docs.oasis-open.org/ws-sx/ws-secureconversation/200512/dk"/>
                        </wsse:SecurityTokenReference>
                    </dsig:KeyInfo>
                </dsig:Signature>
                <wsu:Timestamp wsu:Id="Timestamp__fmK9GnEuj5Qplaql" xmlns:wsu="http://docs.oasis-open.org/wss/2004/01/oasis-200401-wss-wssecurity-utility-1.0.xsd">
                    <wsu:Created>2009-10-18T08:02:53Z</wsu:Created>
                    <wsu:Expires>2009-10-18T08:03:53Z</wsu:Expires>
                </wsu:Timestamp>
            </wsse:Security >
        </env:Header>
        <env:Body wsu:Id="Body__5C0A91dFL3f6bVEY" xmlns:wsu="http://docs.oasis-open.org/wss/2004/01/oasis-200401-wss-wssecurity-utility-1.0.xsd">
            <ns1:EncryptedData Id="jlDe2p1EvtmE7vWK" Type="http://www.w3.org/2001/04/xmlenc#Content" MimeType="text/xml" Encoding="UTF-8" xmlns:ns1="http://www.w3.org/2001/04/xmlenc#">
                <ns1:EncryptionMethod Algorithm="http://www.w3.org/2001/04/xmlenc#aes256-cbc"/>
                <ns2:KeyInfo xmlns:ns2="http://www.w3.org/2000/09/xmldsig#">
                    <wsse:SecurityTokenReference xmlns:wsse="http://docs.oasis-open.org/wss/2004/01/oasis-200401-wss-wssecurity-secext-1.0.xsd" xmlns:wsse11="http://docs.oasis-open.org/wss/oasis-wss-wssecurity-secext-1.1.xsd" xmlns:wsu="http://docs.oasis-open.org/wss/2004/01/oasis-200401-wss-wssecurity-utility-1.0.xsd" wsse11:TokenType="http://docs.oasis-open.org/ws-sx/ws-secureconversation/200512/dk" wsu:Id="str__wBsUF6xr9BrmIuAS">
                        <wsse:Reference URI="#Tjpw87wHqaHgab34" ValueType="http://docs.oasis-open.org/ws-sx/ws-secureconversation/200512/dk"/>
                    </wsse:SecurityTokenReference>
                </ns2:KeyInfo>
                <ns1:CipherData>
    <ns1:CipherValue>Tid2Tw0PhYx3sdSziXPd9nstJmfCxxf3dVWcRgwbaJcLz8jJRWA6Mapmmyg8ZH+WLDoXrZeA0bU
gBHArUXzr6ebGYR50vuiihF0thjb/IsYSi55djt5g0L9mLOVlqDXJKl/wIoykiqjxZpg+k3ADrPiDSYmm8H7ZGUMyficMpDw=</ns1:CipherValue>
                </ns1:CipherData>
            </ns1:EncryptedData>
        </env:Body>
    </env:Envelope>
```

Figure 1B:
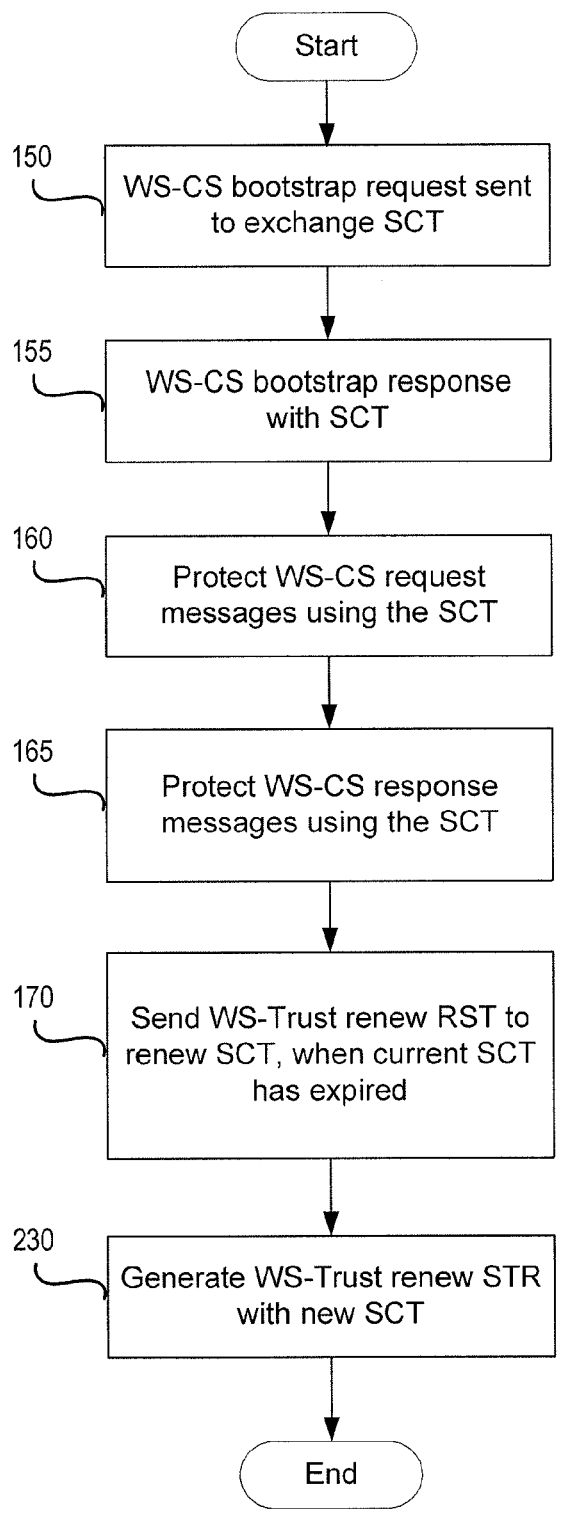
FIG. 1B is a flow diagram describing aspects of the present invention.

Turning now to FIG. 1B, which illustrates a method which may be implemented by the system in FIG. 1A. At process block 150, the WS-SC bootstrap request is sent to exchange the SCT. At process block 155, the WS-SC bootstrap response with SCT is sent in response to the WS-SC bootstrap request. Then, WS-SC request messages are protected by SCT (process block 160), and WS-SC response messages are also protected by SCT (process bock 165). At process block 170, a WS-Trust renew RST is sent to renew the SCT when current SCT has expired. Then, the WS-Trust renew RSTR is sent with new SCT.

Figure 1C:
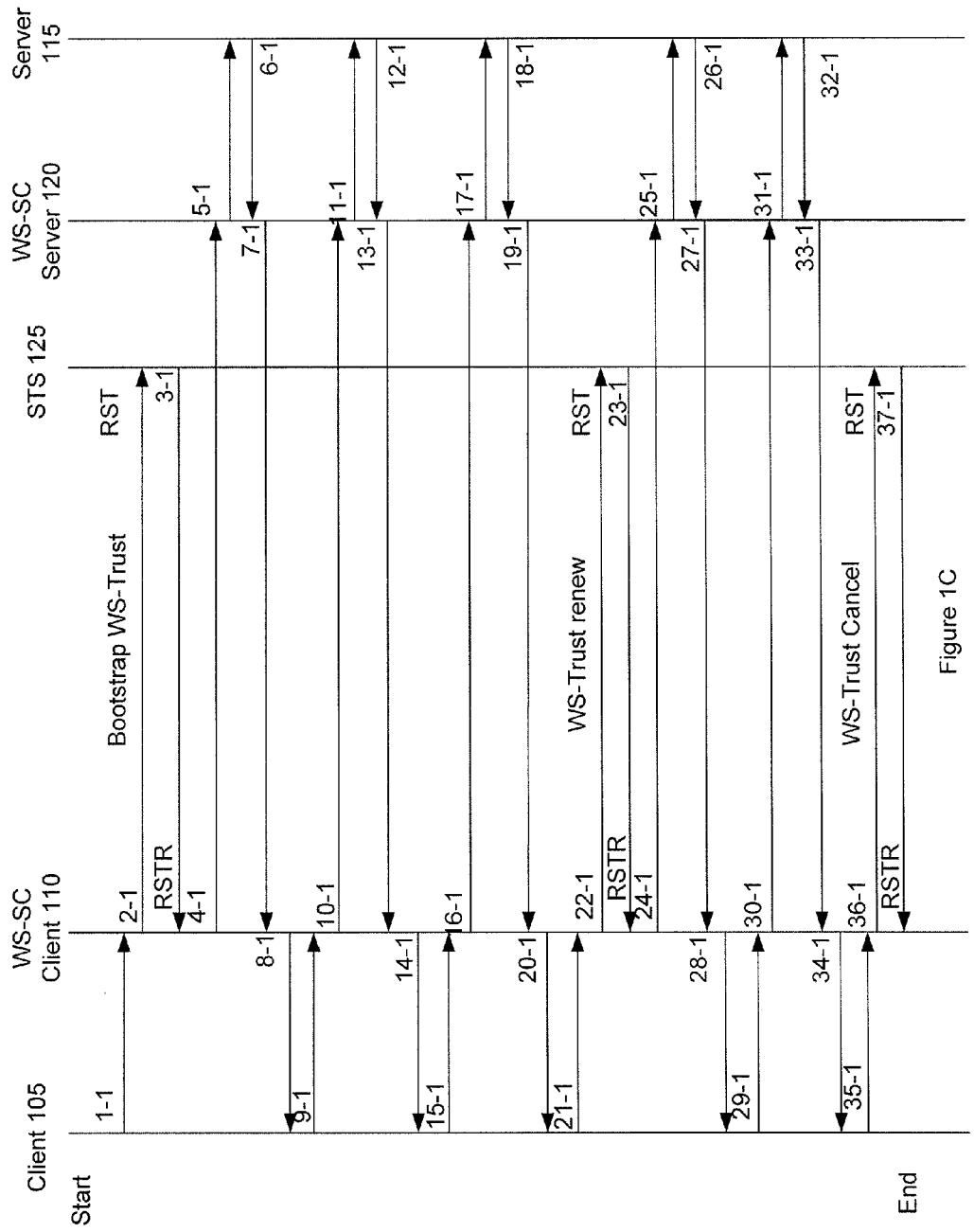
FIG. 1C is a time-flow diagram describing aspects of the present invention.

FIG. 1C illustrates a time-sequence diagram according to the system in FIG. 1A and the method in FIG. 1B. at point 1-1, the application on client 105 sends a request to the application on the server 115, and the WS-SC client 110 receives the request. At point 2-1, the WS-SC client 110 detects that no SCT is stored (or present), and in response sends a bootstrap WS-Trust request to the STS 125 on the server 115. In one embodiment, this is a WS-Trust RST (Request Security Token) message that uses client credentials to exchange the SCT.

At point 3-1, the STS 125 verifies the credentials, and upon verification of the credentials, sends back the SCT. In one embodiment, this is a WS-Trust RSTR (Request Security Token Response) message. The STS 125 also saves this SCT at the server 115. at point 4-1, the WS-SC client 110 uses the SCT that was just received to protect the request message from the message context, and sends the message. The SCT will also be saved onto WS-SC client 110's persistence. The WS-SC server 120 retrieves the SCT from the SCT persistence (on the server 115), put the SCT onto the message context, use the SCT to decrypt the message and verify the signature, and then send to the application on the server 115 (point 5-1). The application on the server 115 processes the request and generates the response payload (point 6-1).

At point 7-1, the WS-SC server 120 uses the same SCT on the message context to protect the message, and sends the message back a secured response to the WS-SC client 110. At point 8-1, the WS-SC client 110 receives the message, uses the same SCT on the request message context to decrypt the message, verifies the signature, and then sends the response payload back to the application on the client 105. The application then sends another request to the server 115 (point 9-1). The WS-SC client 110 checks for and find the SCT on stored at the client 105, places the SCT on the message context, and uses the SCT to protect the message.

Furthermore, at points 11-1 through 14-1, the process in points 5-1 through 8-1 are repeated, and subsequently points 15-1 through 20-1 are repeated as points 9-1 through 14-1. Then, at point 21-1, the application on client 105 sends another request to the server 115. The WS-SC client 110 discovers that the SCT stored at the client 105 has expired, and sends a SCT renew request to the STS 125, which is a WS-Trust RST message (point 22-1). At point 23-1, the STS 125 sends the response back with a new version of the SCT by using an WS-Trust RSTR (the STS 125 also saves this SCT onto the server 115 for future use).

At point 24-1, the WS-SC client 110 replaces the expired SCT with newly received SCT, puts the SCT into message context, and uses it to protect the request message (the WS-SC client 110 also saves the new SCT). Further, at points 25-1 through 28-1, the process in points 5-1 through 8-1 are repeated, and subsequently points 29-1 through 340-1 are repeated as points 9-1 through 14-1.

At point 35-1, the application at the client 105 proceeds with the communication between the application at server 115. The WS-SC client 110 sends a SCT cancel request to the STS 125, which is a WS-Trust RST message. At point 37-1, STS sends back the response (RSTR) to complete the cancel SCT operation.

Figure 2A:
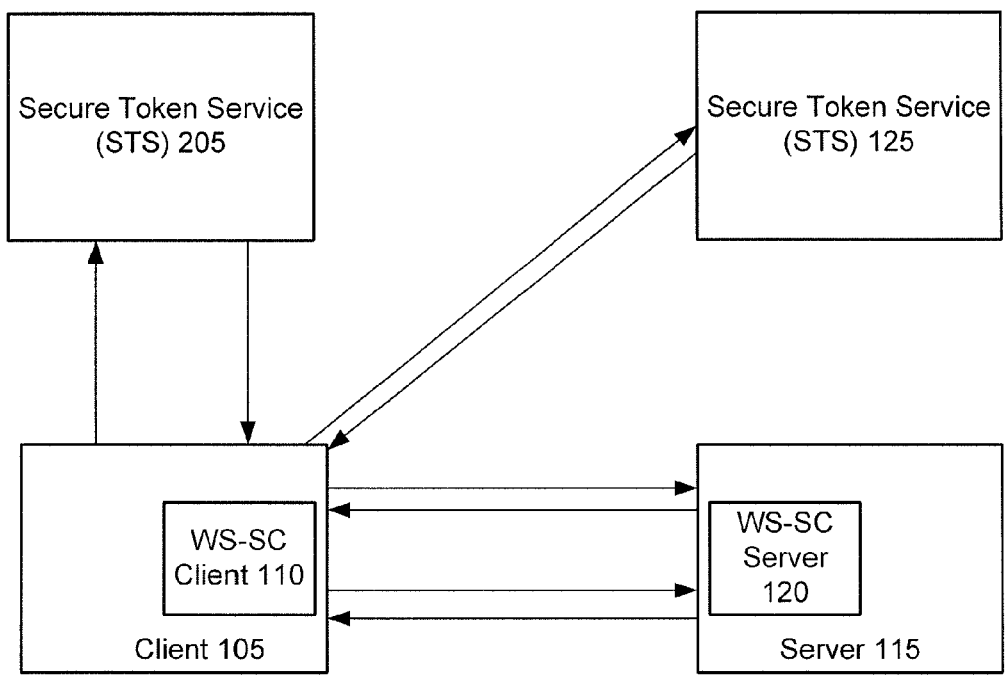
FIG. 2A is a system diagram for implementing aspects of the present invention.

Referring now to FIG. 2A, which illustrates a system for implementing message flow with the security assertion markup language (SAML) token for a bootstrap. The system includes a client 105 (which includes a WS-SC client 110), a server 115 (which includes a WS-SC server 120), a server STS 125 and a client STS 205. In one embodiment, the system in FIG. 2A may be used if the WS-SC bootstrap is using an SAML token for authentication, and the SAML token may need to be issued by a remote STS (i.e., STS 205).

The messages exchanged for this system includes sending, from the WS-SC client 110 to the STSS 205 a WS-Trust RST to request an SAML token by using client 105's credential (i.e., a UNT or X509 credential). A WS-Trust RSTR response from the STS 205 to the WS-SC client 110 is sent with SAML token. Further, the WS-SC client 110 sends a WS-SC bootstrap request using SAML token to the STS 125. Then, the STS 125 sends a WS-SC bootstrap response with SCT back to the WS-SC client 110.

In a further embodiment, the WS-SC client 110 sends WS-SC request messages protected by SCT to the WS-SC server 120. The WS-SC server 120 sends WS-SC response messages protected by the SCT back to the WS-SC client 110. Then, once the SCT has expired, the WS-SC server 120 sends a WS-Trust renew SCT request to the WS-SC client 110. The WS-Trust renew response is protected with the new SCT. Furthermore, other message exchanges, including cancel request and response use this same methodology.

Figure 2B:
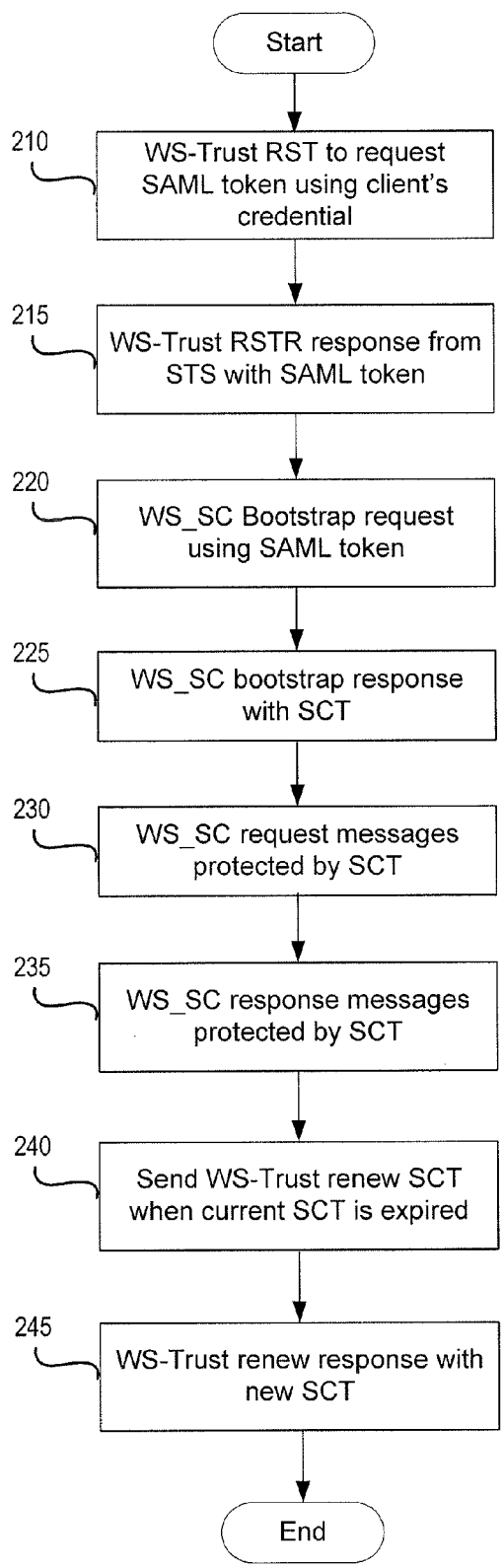
FIG. 2B is a flow diagram describing aspects of the present invention.

Turning now to FIG. 2B, which illustrates a method which may be implemented by the system in FIG. 2A. At process block 210, the WS-Trust RST is sent to request an SAML token by using client's credential (e.g., UNT or X509 credential). At process block 215, the WS-Trust RSTR response is sent from STS with SAML token, and then the WS-SC bootstrap request is sent using SAML token (process block 220). At process block 225, the WS-SC bootstrap response is sent with the SCT, the WS-SC request messages are protected by SCT (process block 230), and the WS-SC response messages are protected by SCT (process block 235).

Figure 2C:
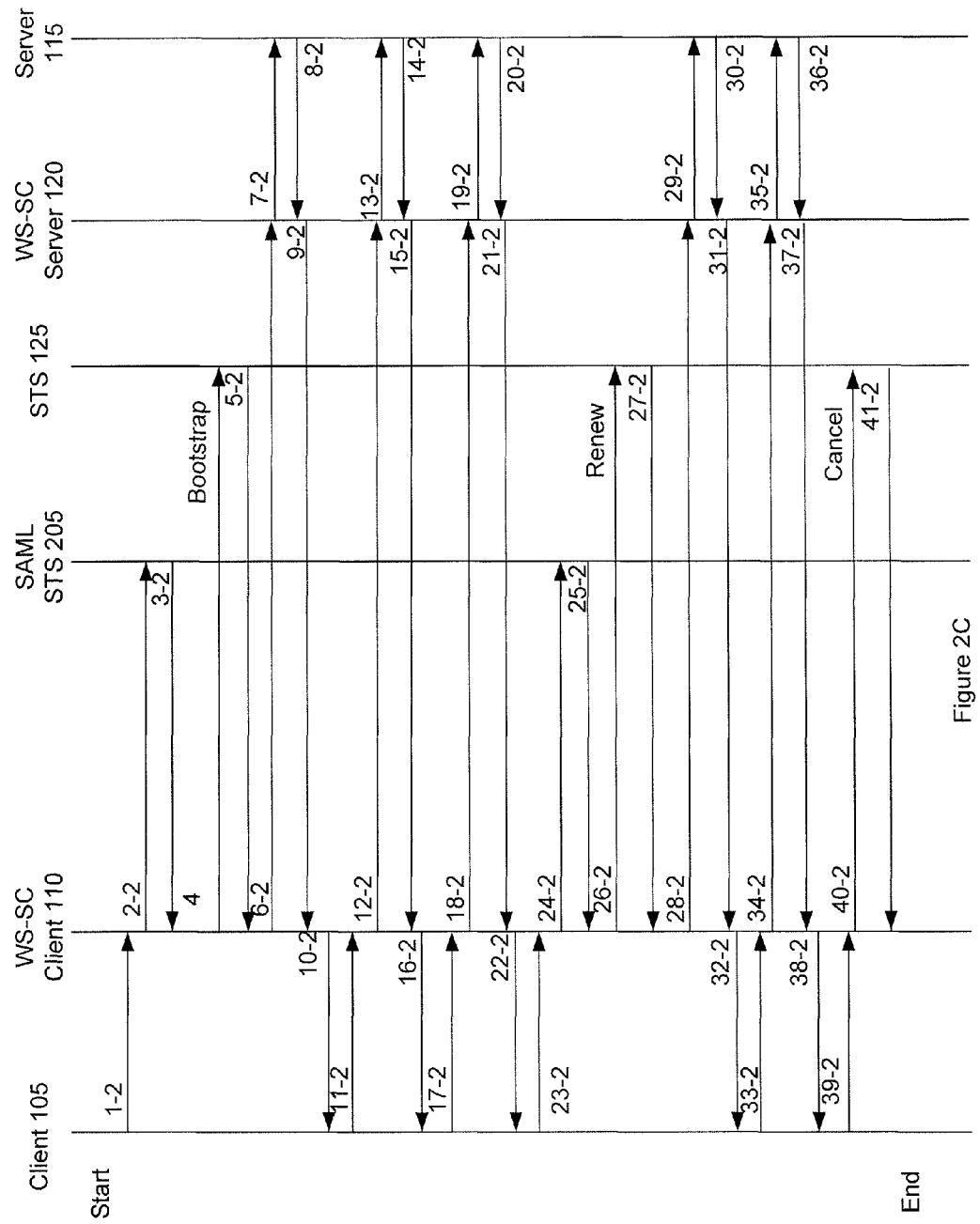
FIG. 2C is a time-flow diagram describing aspects of the present invention.

Furthermore, it is determined at process block 240 that the SCT is expired, and so a WS-Trust renew SCT request is sent. At process block 245, a WS-Trust renew response is sent with new SCT. FIG. 2C illustrates flow to time sequence diagram for implementing message flow with the SAML token for a bootstrap. At point 1-2, the application on the client 105 sends a request to the application on the server 115, and the WS-SC client 110 receives the request. The WS-SC client 110 detects that there is no SCT stored, and sends a bootstrap message to the STS 125 at the server 115 (point 2-2). The client 105 further determines that the SAML token is required for the authentication on bootstrap, so the WS-SC client 110 sends a request message to the SAML STS 205, which is a WS-Trust RST message that uses client credential to exchange SAML token.

The SAML STS 205 verifies the credential and issues the SAML token in its response, which is a WS-Trust RSTR message (point 3-2). At point 4-2, the WS-SC client 110 receives the SAML token on RSTR from SAML STS 205, uses it on the bootstrap message, and sends it to the STS 125. Again, this is a WS-Trust RST message that uses SAML token to exchange SCT. It should also be noted that the SAML token can be persisted for future use within the SAML token's lifetime.

At point 5-2, the STS 125 verifies the credential and sends back the SCT to the WS-SC client 110. This is a WS-Trust RSTR message, and the STS 125 also saves this SCT on the server 115 for verifying the incoming messages in the future. At point 6-2, the WS-SC client 110 then saves the received the SCT onto the message context, uses to protect the request message, and sends the message back. The WS-SC client 110 also saves the SCT for future message protection.

Furthermore, the WS-SC server 120 retrieves the SCT from storage (i.e., by accessing the SCT ID in the incoming message, saves the SCT onto message context, uses the SCT to decrypt the message and verify the signature, and then sends the message to the application on the server 115 (point 7-2). At point 8-2, the application on the server 115 processes the request and generates the response. Then, at point 9-2, the WS-SC server 120 uses the same SCT in the message context to protect the message, and send back a secured response.

The WS-SC client 110 receives the message, uses the same SCT in the message context to decrypt the message and verify the signature, and sends back the payload to application on the server 115 (point 10-2). At point 11-2, the application on the client 105 sends another request to the server 115. At point 12-2, the WS-SC client 110 checks and finds the stored SCT, places the stored SCT onto message context, and uses the SCT to protect the message.

At point 13-2, the WS-SC server 120 performs the same functions as performed at point 7-2. Furthermore, points 14-2 through 16-2 are the same as points 8-2 though 10-2, and points 17-2 through 22-2 are the same as points 11-2 to 16-2. Then, at point 23-2, the application on the client 105 sends another request to the server 115. The WS-SC client 110 determines that the stored SCT has expired, and as such needs to get the SAML token again from the SAML STS 205 (point 24-2). The WS-SC client 110 sends a request message to SAML STS 205, which is a WS-Trust RST message that uses client 105's credential to exchange SAML token.

At point 25-2, the SAML STS 205 verifies the credential and issues the SAML token in its response which is a WS-Trust RSTR message. At point 26-2, the WS-SC client 110 receives the SAML token on RSTR from SAML STS 205, uses it on the SCT renew request message, and sends to the STS 125 (which is a WS-Trust RST message). At point, 27-2, the STS 125 sends back the response with a new version of SCT by using WS-Trust RSTR (the STS 125 also saves the new SCT onto its SCT persistence). The WS-SC client 110 then saves the newly received SCT, places the new SCT onto the message context, and uses the new SCT to protect the request messages (point 28-2).

Points 29-2 though 32-2 are the same as 7-2 through 10-2, and points 33-2 through 38-2 are the same as points 11-2 through 16-2. At point 39-2, the application on the client 105 initiates a competition of the conversation. At point 40-2, the WS-SC client 110 sends a SCT cancel request to the STS 125 (which is a WS-Trust RST message). Then, the STS 125 sends back the response (RSTR) to complete the cancel SCT operation (point 41-2).

Figure 3A:
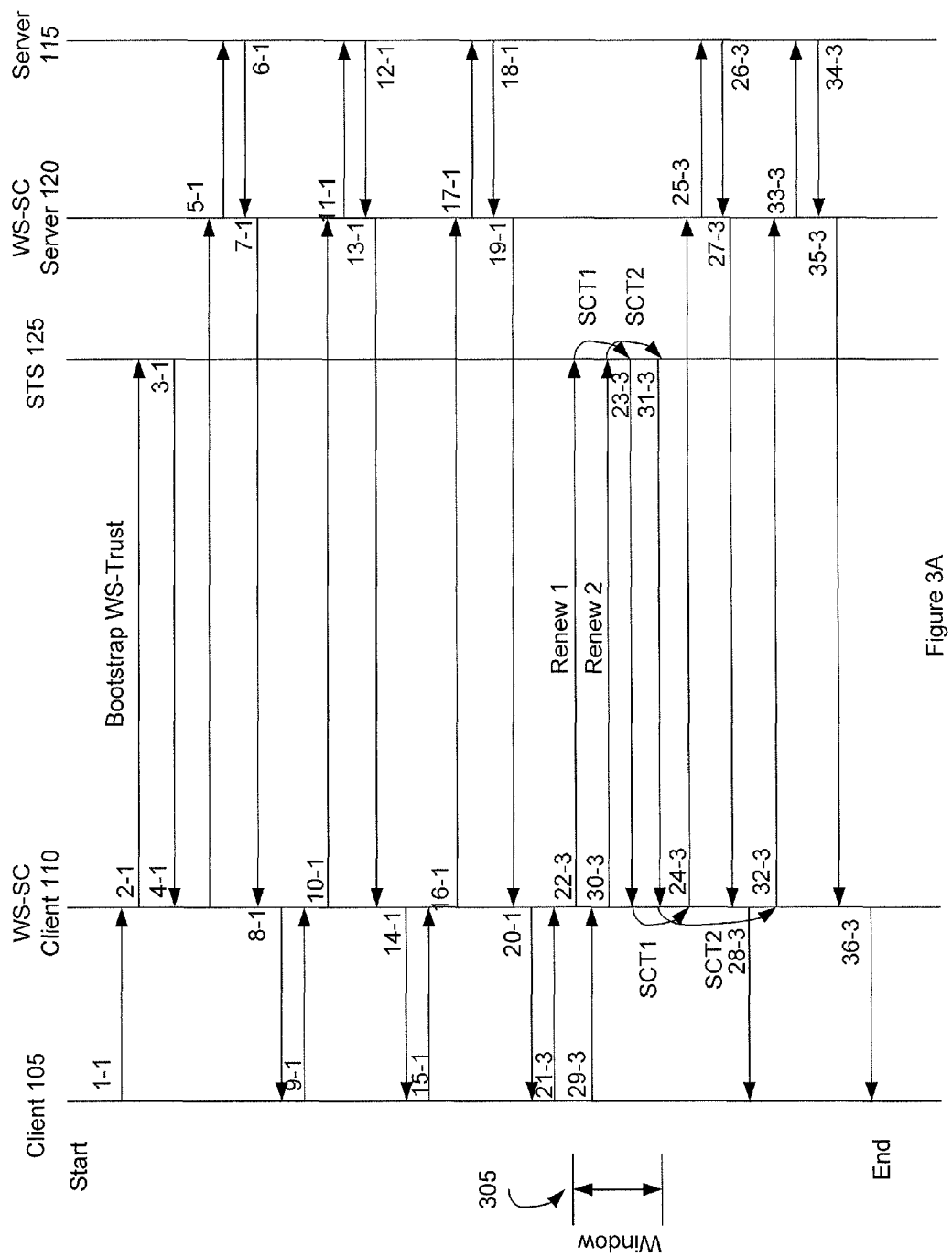
FIGS. 3A-3J are time-flow diagrams describing error conditions related to aspects of the present invention.

There are a number of error conditions associated with the SCT renewal process described in the above figures (FIGS. 1A-2C). For example, race conditions on SCT renewal include 1) Multiple SCT renewals, 2) Server SCT is expired, 3) SCT is expired upon arrival. FIG. 3A illustrates a flow to time sequence diagram showing the race condition for multiple SCT renewals. This situation is not necessarily a failure condition, but multiple WS-Trust renew requests are unnecessary and very inefficient. When WS-SC client 110 detects that the current SCT has expired, the WS-SC client 110 sends a SCT renewal request to the STS 125. However, before the WS-SC client 110 has a new SCT from the response, all subsequent messages come-in from the application will cause the SCT renew message be sent. In other words, the delay between the WS-SC client 110 realizing the expiration, sending the request to the STS 125, and receiving the new SCT from the STS 125, causes additional unnecessary SCT renew requests to be sent.

With regard to FIG. 3A, it should be noted that points 1-1 through 20-1 operate in the same or similar manner to points 1-1 through 20-1 in FIG. 1C (described above). As such, the description of FIG. 3A will begin at point 21-3. At point 21-3, the application at client 105 sends a subsequent request to the server 115. At point 22-3, the WS-SC client 110 determines that the SCT (i.e., SCT0) has expired, and in response the WS-SC client 110 sends an SCT renew request to the STS 125 (which is a WS-Trust RST message).

The STS 125 sends back the response with a new of SCT (i.e., SCT1), using the WS-Trust RSTR. The STS 125 also saves SCT1 for future use (point 23-3). At point 24-3, the WS-SC client 110 replaces the old expired SCT (SCT0) with the newly received SCT1, and uses SCT1 to protect the request message (the WS-SC client 110 also stores the SCT1 for future use).

Further, after point 21-3, but before point 24-3, the application at the client 105 immediately sends another request to the server. So, at point 30-3, since the new version of SCT has not yet arrived, and the stored SCT is still the old expired SCT0, WS-SC client 110 sends another SCT renew request to the STS 125. As such, point 31-3 and 32-3 correspond to points 23-3 and 24-3, and a new (unnecessary) SCT2 is requested and returned to WS-SC client 110. In fact, there is a window 305 after point 21-3 which detects that the SCT has expired and before point 24-3 stores the new version of the SCT, in which all application requests that hit the WS-SC client 110 will generate a SCT renew request to STS 125. If the renew request needs to go to a remote STS, for example, to get an SAML token, the window will even larger, and there will have more redundant message exchanges between WS-SC client 110 and SAML STS 205, and between WS-SC client 110 and the STS 125. Furthermore, it should be noted that points 25-3 through 28-3 and 33-3 through 36-3 are similar to message exchanges between the server 115, WS-SC server 120 and the WS-SC client 110 and client 105, as described above at least in FIG. 1C.

FIG. 3B illustrates a flow to time sequence diagram showing the race condition for when the server SCT has expired. The SCT on the server 115 is stored by the SCT ID, and it will be retrieved by the SCT ID within the incoming message and put onto the message context. On a response, the message context will be retrieved and the SCT in the message context will be used. If the response takes a long time to process by the time the message context is retrieved, the SCT may be already expired. This causes another race condition error. With regard to FIG. 3B, it should be noted that points 1-1 through 1-18 operate in the same or similar manner to points 1-1 through 18-1 in FIG. 1C (described above). At point 19-4, a response message from the WS-SC server 120 is sent to WS-SC client 110; however, at the 'X' in the figure, the current SCT (SCT0) expires. So, even though at the time the response was sent, SCT0 was still valid, it will nonetheless be expired by the time the WS-SC client 110 receives the response.

As such, at point 20-4, the application on client 105 sends a request to the server 115. Then at point 21-4, the WS-SC client 110 determines that the stored SCT has expired (i.e., SCT0), WS-SC the client 110 sends a SCT renew request to the STS 125 (which is a WS-Trust RST message). At point 22-4, the STS 125 sends back the response with a new version of SCT (i.e., SCT1) using WS-Trust RSTR. At point 23-4, the WS-SC client 110 stores the newly received SCT (SCT1), places it into the message context, and uses it to protect the outgoing message, as well as to handle the incoming response message.

Accordingly, as point 19-4 occurs the SCT0 is retrieved and the SCT0 has already expired, the WS-SC server 120 is unable to use the expired SCT to protect the response message. Furthermore, points 24-4 though 27-4 perform similar to points 25-1 through 28-1 in FIG. 1C.

Figure 3C:
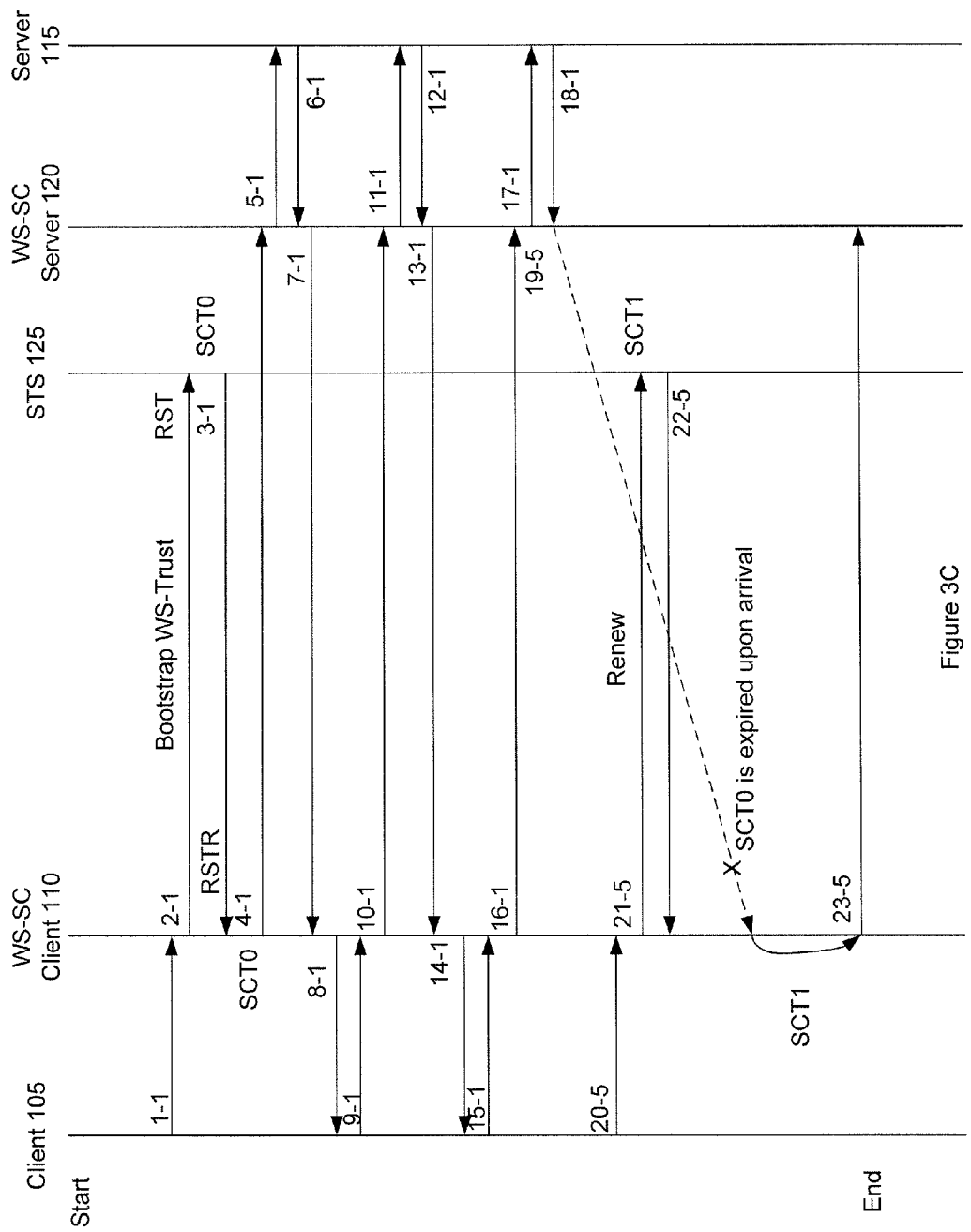

Turning now to FIG. 3C, which illustrates a flow to time sequence diagram showing the race condition for when the SCT has expired upon arrival. This situation is similar to the pervious situation in FIG. 3C; however, the SCT is not expired when WS-SC server 120 uses the retrieved SCT to protect the response, but instead, during the message traveling to the WS-SC client 110, the SCT has expired. With regard to FIG. 3C, it should be noted that points 1-1 through 1-18 operate in the same or similar manner to points 1-1 through 18-1 in FIG. 1C (described above).

At point 20-5, the application on client 105 sends a request to the server 115. Then, at point 21-5, the WS-SC client 110 determines that the stored SCT has expired, and the WS-SC client 110 sends a SCT renew request to the STS 125. at point 22-5, the STS 125 sends back the response with a new version of SCT (i.e., SCT1) using WS-Trust RSTR. The message sent at point 23-5 is protected by SCT1. However, at point 19-5 (which occurs prior to point 20-5), the server 115 still has an "about to expire" SCT0 stored, and uses SCT0 to protect the response message. This response message arrives to the WS-SC client 110, but by the time it arrives (i.e., at point 'X' in FIG. 3C) the SCT0 is already expired. As such, the client 105 is unable to handle this late arrival response from this message.

Figure 3D:
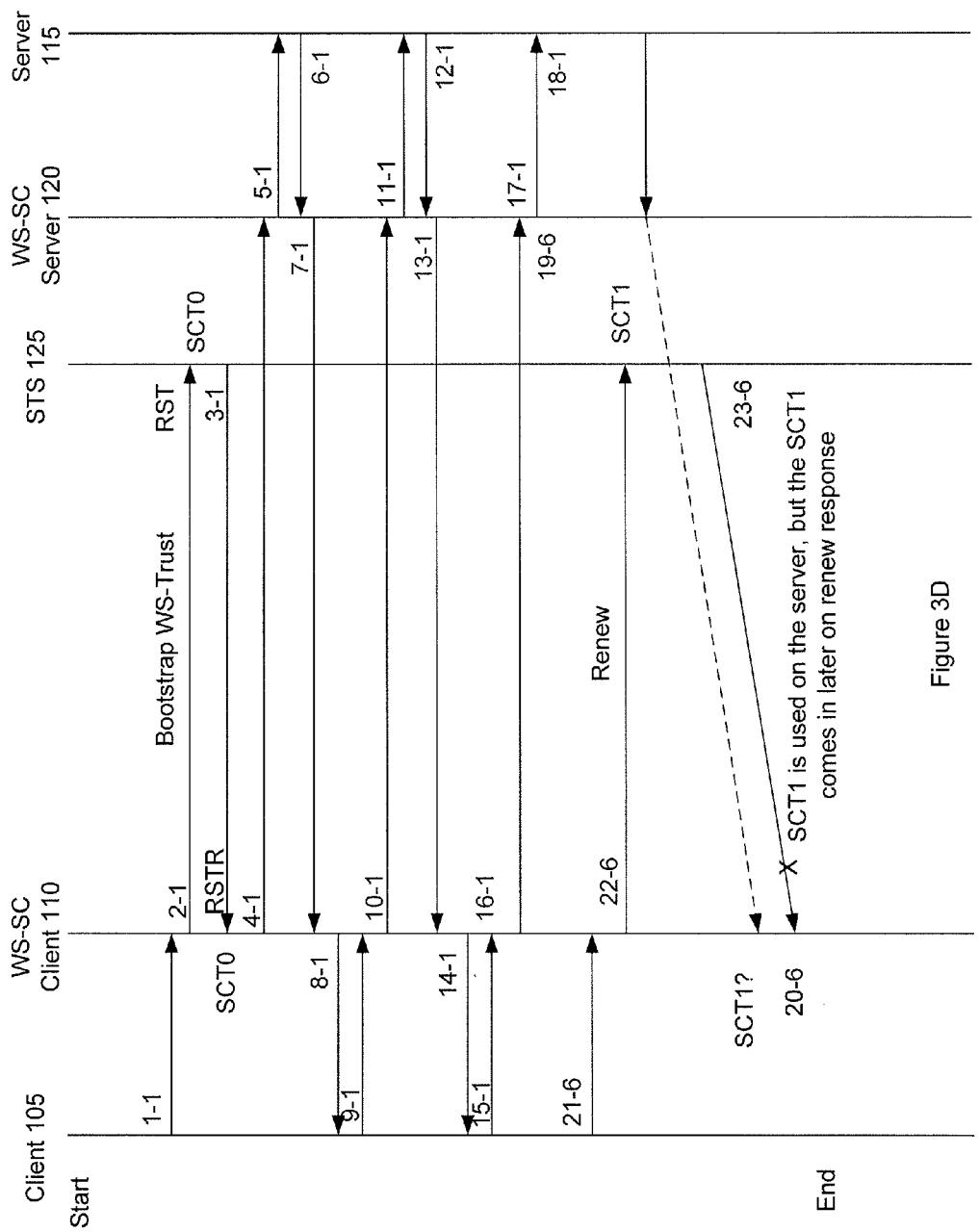

Certain race conditions on a response also exist. The situation in FIG. 3D is similar to the situations in FIGS. 3B and 3C; however, the WS-SC server 120 get the most current SCT stored. The SCT is only made available on the WS-SC server 120 and it is picked-up by a response message processor and used for response message protection. However, the SCT renew response that travels back to the WS-SC client 110 is slower then the secure conversation response message that is protected by the new SCT. As such, when the response message (protected by the new SCT) reaches to the WS-SC client 110, the SCT renew response has not yet arrived, and the WS-SC client 110 does not understand the new SCT. Accordingly, an exception is thrown for SCT as unknown. The cause of this SCT race condition can be illustrated in the time-sequence of FIG. 3D.

With regard to FIG. 3D, it should be noted that points 1-1 through 1-18 operate in the same or similar manner to points 1-1 through 18-1 in FIG. 1C (described above). At point 21-6, before sending a response back from the server 115 at point 19-6, the application at client 105 sends a request to the server 115. at point 22-6, the WS-SC client 110 discovers that the stored SCT has expired, so the WS-SC client 110 sends a SCT renew request to the STS 125 (which is a WS-Trust RST message). At point 23-6, the STS 125 sends back the response with a new version of SCT (SCT1) using WS-Trust RSTR.

However, at point 19-6 (which occurs before point 23-6), the server 115 uses the latest SCT (SCT1) to protect the response message. This response message arrives to the WS-SC client faster then the message at point 23-6 (where the WS-SC client 110 still only has SCT0, and does not yet know about SCT1). As such, the WS-SC client 110 is unable to handle this faster arrival response from message point 19-6. Accordingly, at point 20-6, the WS-SC client 110 does not recognize SCT1 and an error occurs.

Figure 3E:
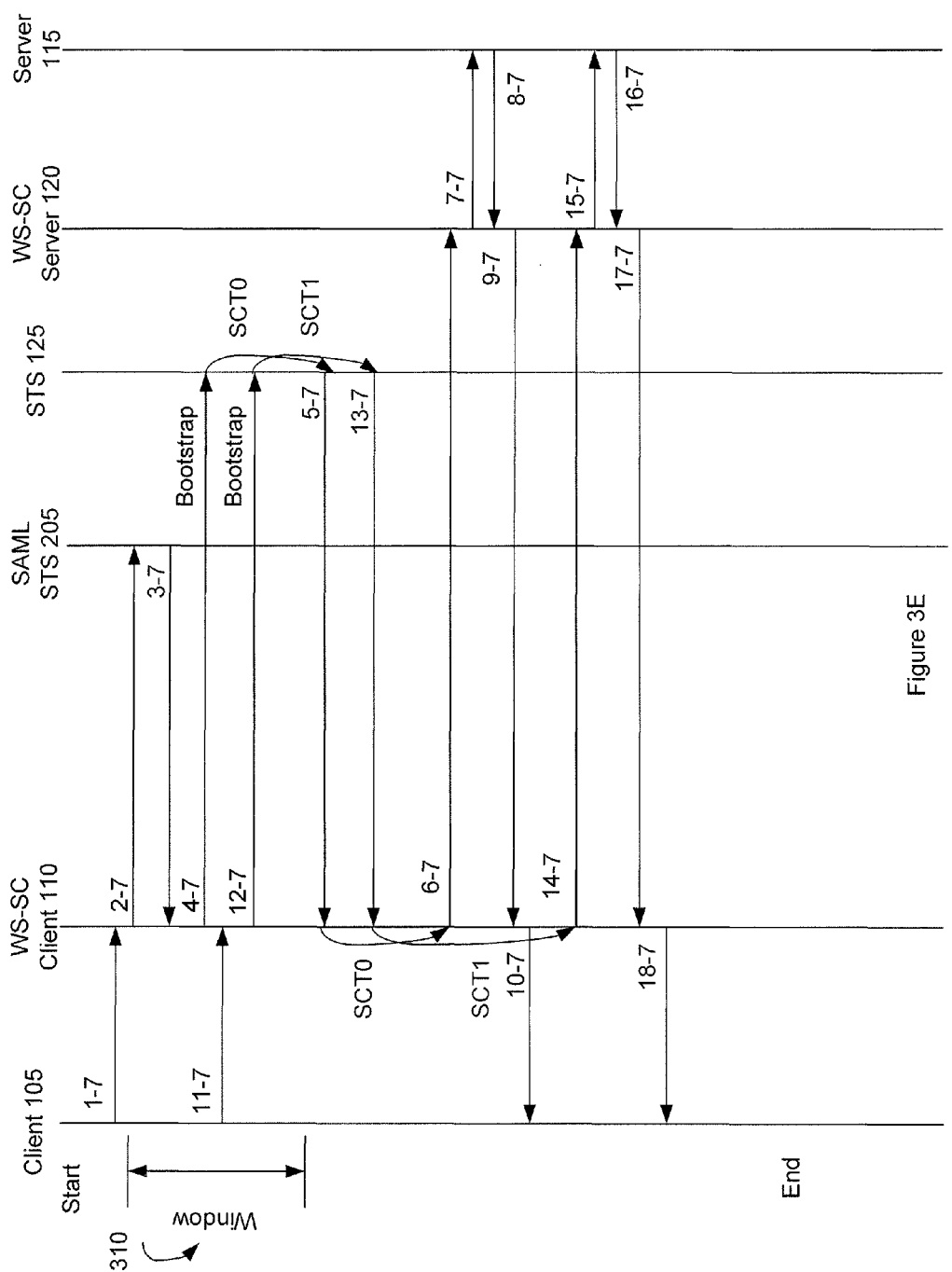

Turning now to FIG. 3E, which illustrates a flow to time sequence diagram showing multiple bootstraps error condition. The error condition on multiple unnecessary WS-Trust messages between the client 105 and the STS 125 is not limit to the SCT renew request only. In fact, it will have similar situation during the bootstrap for multiple bootstrap request messages. When the bootstrap needs to go to a remote STS (i.e., the SAML STS 205) to get the SAML token the window is winder and it will have an increased chance of running into the error condition of multiple bootstrap messages. The cause of this error condition can be illustrated on the time-sequence diagram in FIG. 3E, by using the WS-SC bootstrap with SAML token message.

At point 1-7, the application on the client 105 sends a request to the application on the server 115 and the WS-SC client 110 receives the request. At point 2-7, the WS-SC client 110 sends a request message to the remote SAML STS 205, which is a WS-Trust RST message that uses the client 105's credential to exchange SAML token. The SAML STS 205 verifies the credential and issues the SAML token in its response which is a WS-Trust RSTR message (point 3-7).

At point 4-7, the WS-SC client 110 receives the SAML token on RSTR from remote SAML STS 205, uses the SAML token on the bootstrap message, and sends to the STS 125. Again, this is a WS-Trust RST message that uses SAML token to exchange SCT. At point 5-7, the STS 125 verifies the credential and sends back the SCT. This is a WS-Trust RSTR message, and the SCT is version 0 (SCT0). The STS 125 also stores the SCT0.

At point 6-7, the WS-SC client 110 uses SCT0 to protect the request message, and sends the message out. At point 8-7, the server 115 initiates a response to the client 105. At point 9-7, SCT0 will also be used to protect the response, which is then sent to client 105 (point 10-7). At point 11-7, the application on the client 105 sends another request to server 115 (this occurs after the message at point 3-7 and before the message at point 5-7 arrive). At point 12-7, the WS-SC client 110 checks for an SCT and determines that no SCT is found, due to the fact that the message from point 5-7 has not yet arrived. As such, the WS-SS client 110 needs to send a bootstrap message to the STS 125. The client 105 further finds that the SAML token for authentication is required for bootstrap, but it just received the SAML token from remote SAML STS 205. The client 105 sends a WS-SC bootstrap request message to STS 125, which is a WS-Trust RST message that uses SAML token to exchange SCT.

Furthermore, at point 13-7, the STS 125 verifies the credential and sends back the SCT (SCT1). This SCT will be used to protect the message at point 14-7 and point 18-7. There is a window 310 after 1-7 and point 6-7 that saves the newly arrive SCT, in which all application requests hit the WS-SC client 110 and will generate WS-SC bootstrap messages. If the bootstrap needs to go to remote SAML STS 205 to get the SAML token, the window will be even larger and even more redundant message exchanges between WS-SC client 110 and SAML STS 205, between WS-SC client 110 and STS 125 will occur.

The error conditions in FIGS. 3A-3E are race conditions are based on synchronize conversations. That is that when the request is sent from the client side, the process will wait for the response back and then perform the next step. In fact, the conversations between client and server can be asynchronous, especially when combining WS-SC with other protocols, such as WS-RM and WS-MC. The WS-Trust message exchange between WS-SC client 110 and WS-SC STS 125 can be asynchronous as well, in the asynchronous trust scenarios. These scenarios make the window for error conditions even winder. That is, there is an increased chance of running into multiple bootstraps or multiple renew request messages in the winder window conditions under the heavy load, and it may also get into SCT expirations more frequently when it takes a long time to process response.

Furthermore, error conditions on a cancel SCT exist. The cancel SCT request/response may also create a race condition when the WS-Trust cancel request/response has been completed, and then some late arrival response messages are protected by the cancelled SCT. Since the SCT on client's storage has been cancelled, it will not be able to handle the late arrival messages. Another error condition is when the application fails to send the cancel SCT request it will create the system hold-up of unnecessary resources and cause memory leak conditions.

Another race condition error can occur when the SCT ID is not changed. As the error conditions described in FIGS. 3A-3E all assume that the SCT ID will be changed, when the secrete key is changed. As described above, the SCT ID change is not always mandated, and while it may be simpler to manage and retrieve for the SCT when the SCT ID remains constant during the whole conversation lifetime, it can create additional race conditions, which could generate a number of additional errors.

FIGS. 3F-3J describe additional race conditions when the secrete key is "re-keyed", but the SCT ID remain unchanged. In one embodiment, there are three race conditions on the renew SCT: 1) the client uses an old version of the SCT, 2) the server uses old version of the SCT, and 3) out-of-sync on both the client side and the server side.

Figure 3F:
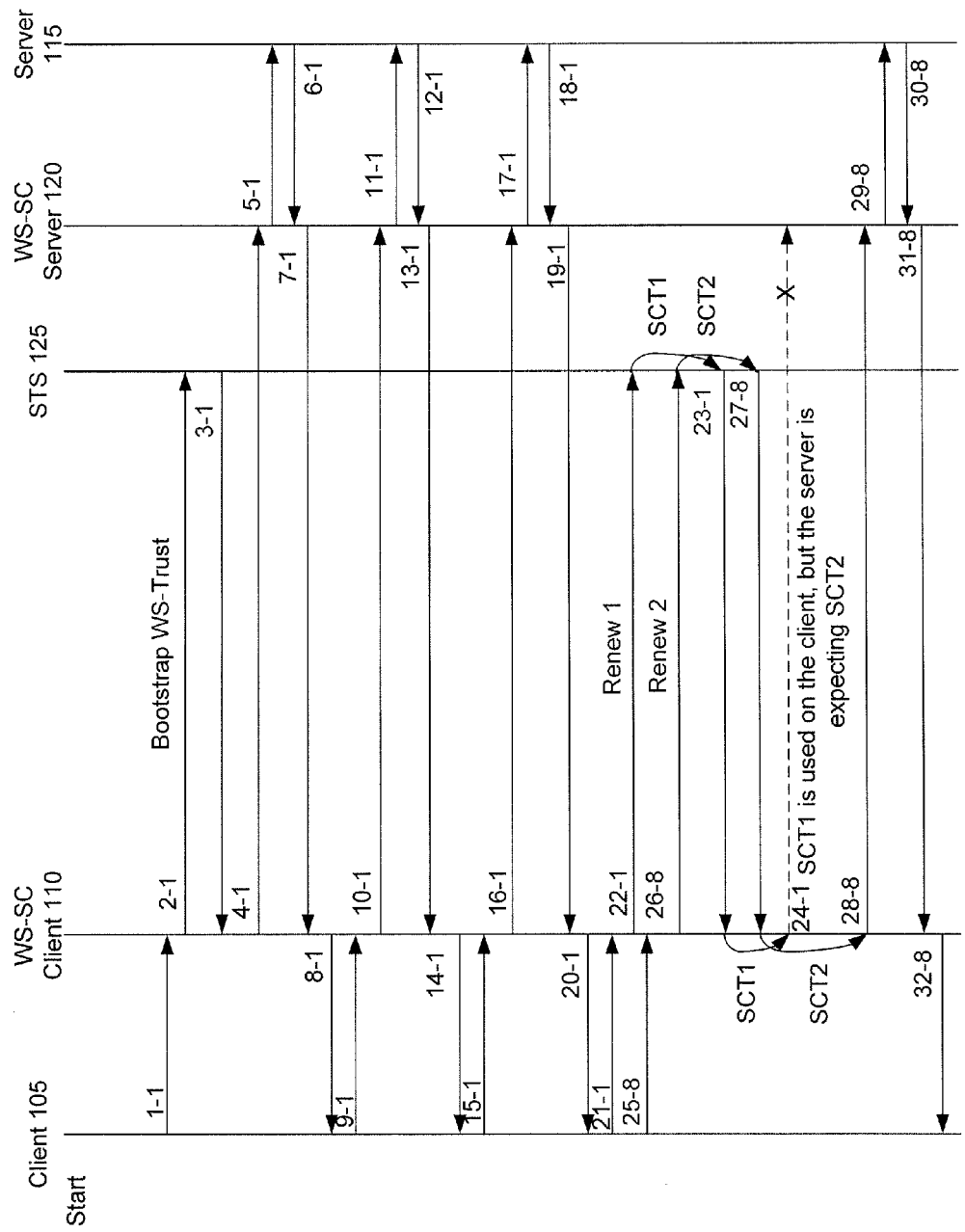

FIG. 3F illustrates the race condition when the client uses an old version of the SCT. In this situation, the client 105 uses SCT version 1 (SCT1) to protect the message, but the server 115 has already advanced to version 2 (SCT2). The server 115 is unable to decrypt and verify the message from the client 105, which causes of this error condition. With regard to FIG. 3F, it should be noted that points 1-1 through 24-1 operate in the same or similar manner to points 1-1 through 24-1 in FIG. 1C (described above).

At point 25-8, the application at the client 105 sends another request to the server 115. At point 26-8, the WS-SC client 110 determines that the stored SCT (SCT0) has expired, then WS-SC client 110 sends a SCT renew request to the STS 125 (which is a WS-Trust RST message). Then, The STS 125 sends back the response with a new version of SCT (SCT1) using WS-Trust RSTR. The STS 125 also saves the SCT1 for future use (point 27-8).

At point 28-8, the WS-SC client 110 replaces the old expired SCT0 with newly received SCT1, and uses it to protect the request message. In this situation, at point 29-8. after point 21-8, the application on the client 105 immediately sends another request to the server 115. Thus, at point 30-8, since the new version of SCT has not yet arrived, and the stored SCT is still the expired SCT0, another SCT renew request is sent to the STS 125. At point 31-8, the STS 125 generates a new version of SCT (SCT2) and sends it back to the WS-SC client 110. The STS 125 also replaces the stored SCT, from SCT1 to SCT2.

Accordingly, after point 27-8, the message at point 24-8 (protected by SCT1) has arrived to the WS-SC server 120, it can use the stored SCT (SCT2) to decrypt the message and verify the signature, but the WS-SC server 120 cannot find the old version of SCT (SCT1), so the WS-SC server 120 is unable to decrypt the message with wrong version of the SCT. Furthermore, the message at point 28-8 will use SCT2 to protect the message, and it will not have problem on the following message exchanges.

Figure 3G:
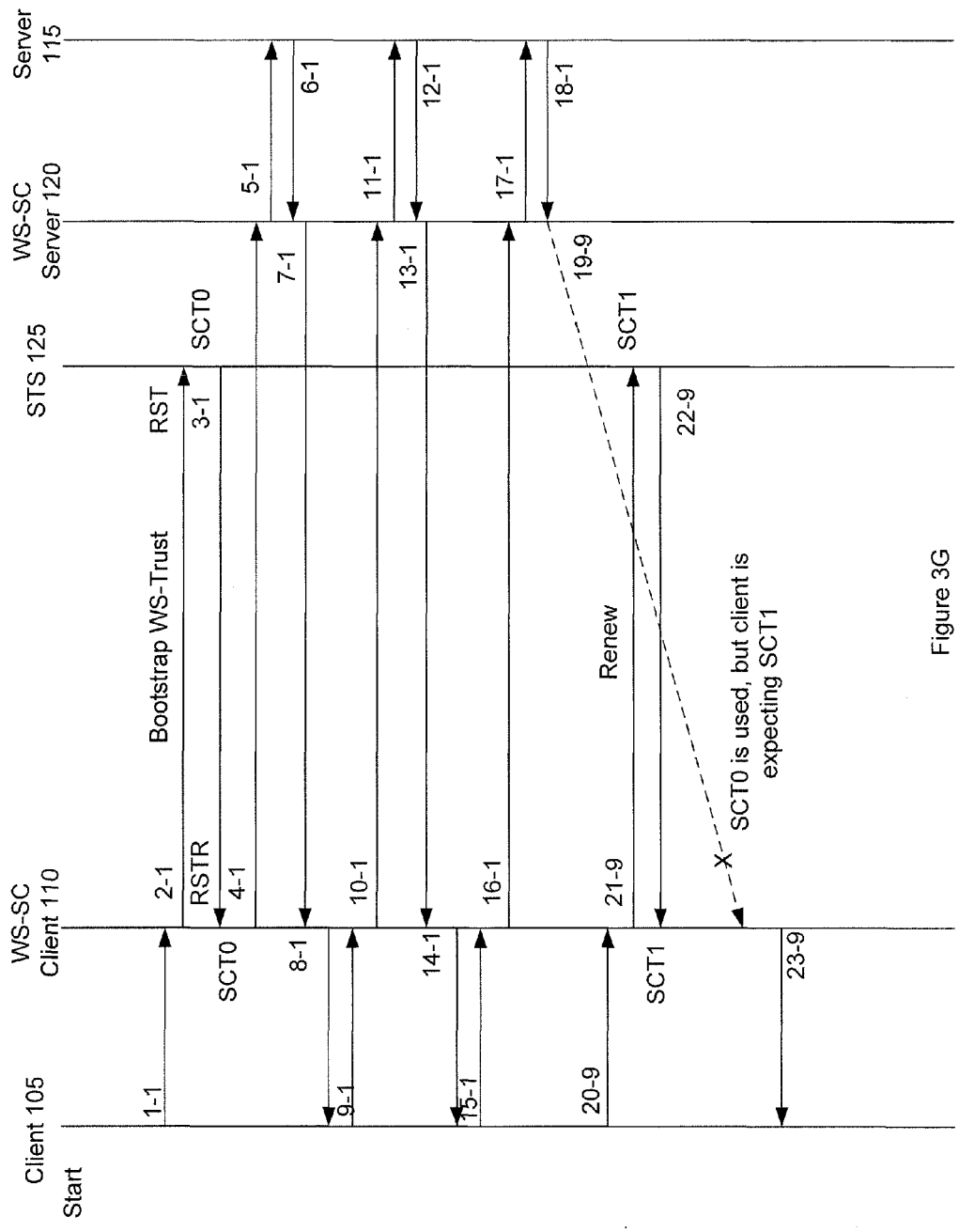

Turning now to FIG. 3G, which illustrates a race condition in which the server uses an old version of the SCT. In this situation, the server 115 uses SCT version 1 (SCT1) to protect the message, but the client 105 has already advance to version 2 (SCT2). The client 105 is unable to handle the late arrival message which is protected by the previous version of the SCT.

With regard to FIG. 3G, it should be noted that points 1-1 through 18-1 operate in the same or similar manner to points 1-1 through 18-1 in FIG. 1C (described above). At point 20-9, before the message at point 19-9 of sending a response back from the server, the application at client 105 sends another request to the server 115. Then, at point 21-9, the WS-SC client 110 determines that the stored SCT has expired, the WS-SC client 110 sends a SCT renew request to the STS 125 (which is a WS-Trust RST message). At point, 22-9, the STS 125 sends back the response with a new version of SCT (SCT1) using WS-Trust RSTR. Then, at point 23-9, the WS-SC client 110 replace the old expired SCT (SCT0) with the newly received SCT (SCT1), and uses SCT1 to handle the incoming response message.

At point, 19-9 (which occurs before the message at point 23-9), the server 115 still has an "about to expire" SCT0, and uses SCT0 to protect the response message. This response message arrives to the WS-SC client 110 later then the message at point 22-9 and point 23-9, where the client has already replaced the stored SCT from SCT0 to SCT1. As such, the client is unable to handle this late arrival response from the message at point 19-9.

Figure 3H:
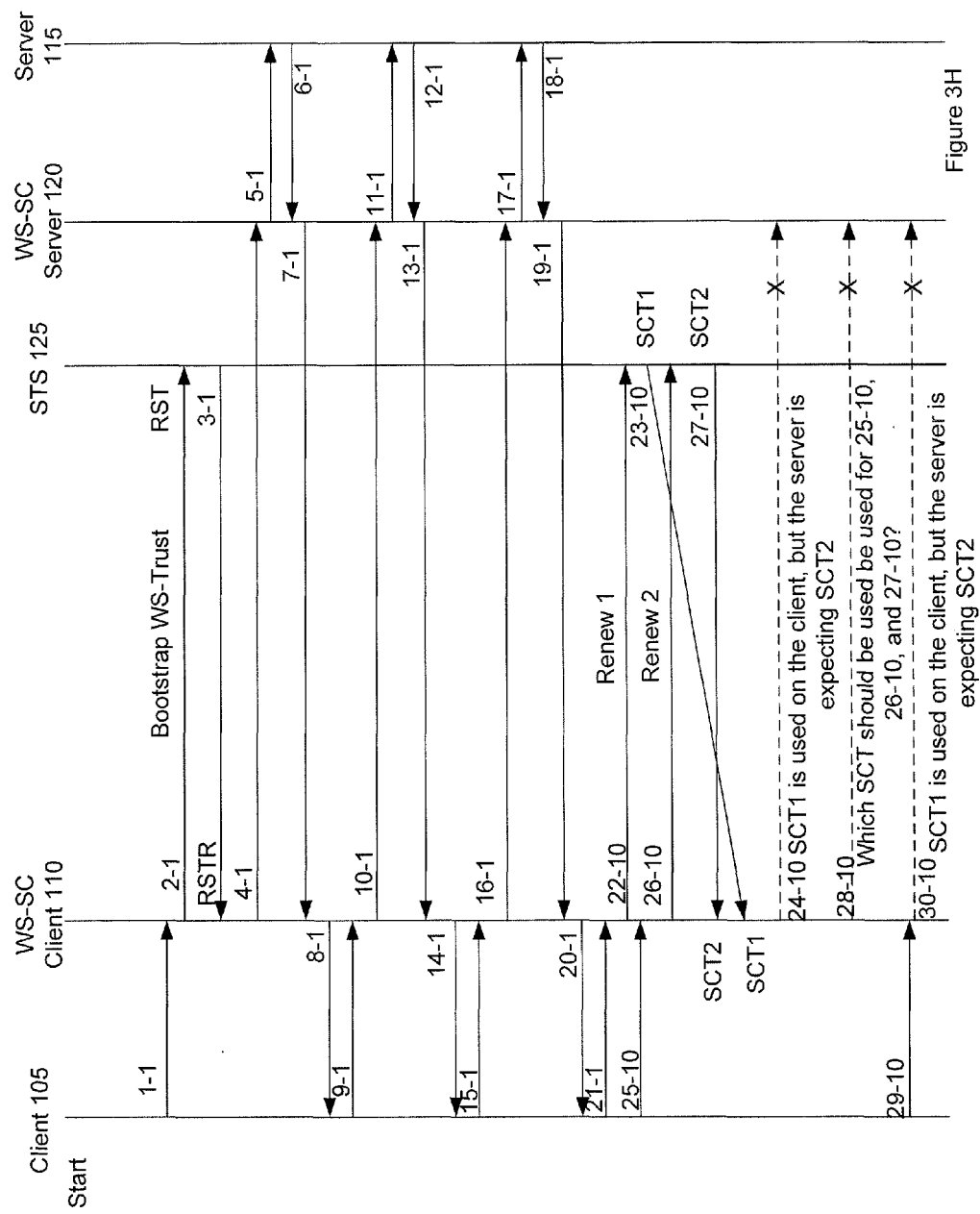
Figure 3L:
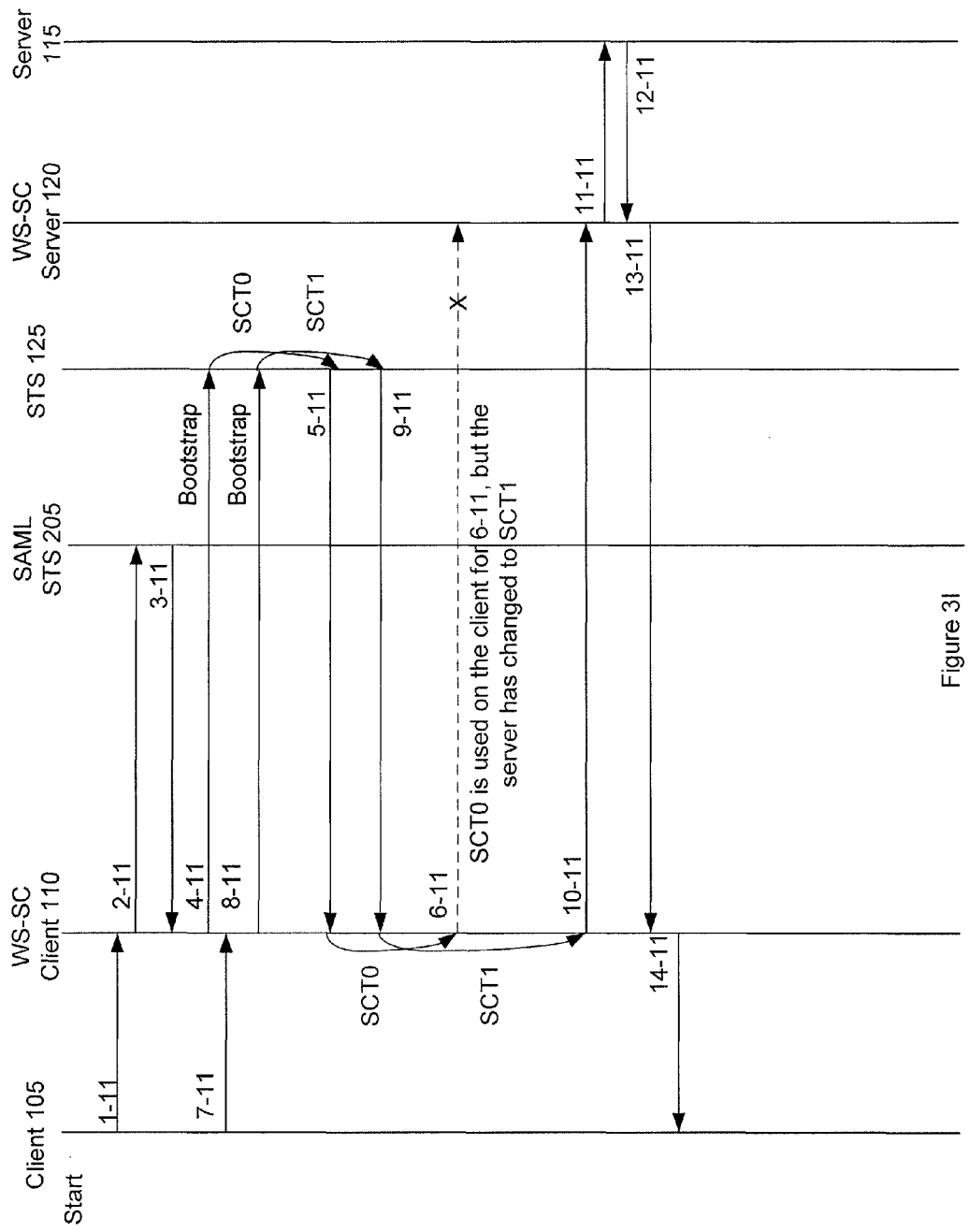

Referring next to FIG. 3H, which illustrates a time flow diagram for an out-of-sync on both the client and server side. In this situation, the server 115 has an SCT version 2 (SCT2) stored, but the client 105's SCT2 has been overwritten with a late arrival of SCT version 1 (SCT1). Now, both the client 105 and the server 115 have different version of the SCT. The out-of-sync of SCT between client 105 and the server 115 will cause the remaining conversations to fail.

With regard to FIG. 3H, it should be noted that points 1-1 through 21-1 operate in the same or similar manner to points 1-1 through 21-1 in FIG. 1C (described above). At point 22-10, the WS-SC client 110 determines that the stored SCT has expired, and it sends a SCT renew request to the STS 125. at point 23-10, the STS 125 sends back the response with a new version of SCT (SCT1) using WS-Trust RSTR. The message in this step will be protected by SCT1 (point 24-10).

Following the message in point 21-10, the application at the client 105 sends another request to the server 115 (point 25-10). Then, at point 26-10, the SCT stored at the WS-SC client 110 is still the expired SCT (SCT0), and so WS-SC client 110 sends another SCT renew request to the STS 125. At point 27-10, the STS 125 sends back the response with a new version of SCT (SCT2). This response may, for example, travel faster then the message at point 23-10, and the client 105 now receives the SCT2 and replaces with its old expired SCT0. Then, the STS 125 response message from point 32-10 arrives at the client 105 and the client 105 uses the SCT1 that just received and replaces the stored SCT. This will override the SCT2 with SCT1. Now, the client 105 has SCT1 and the server 115 has SCT2. as such, the SCTs are out-of-sync.

The client 105 will continue the message received at point 32-10, on at point 24-10 the request message will be protected by the SCT1, but the server is unable to handle this message because it is protected with SCT1 and the server 115 has SCT2 stored. When the SCTs are out-of-sync between the client 105 and server 115, the rest of conversations will fail, and are unable to continue this conversation session. For example, the message at point 28-10 and so on, will have the following behavior. Continuing from the message at point 27-10, the WS-SC client 110 will use the recently received SCT2 to protect the request message and sends it to the server 115. The server 115 has same version of the SCT stored, and it is able to use this SCT2 to decrypt the message and verify the signature.

At point 29-10, the application at the client 105 sends another request to the server 115. The WS-SC client 110 uses SCT1 to protect the message, but the server is excepting SCT2, therefore, the message will fail. Accordingly, a number of failures and errors occur when the client and the server SCTs are out-of-sync.

Accordingly, race conditions on bootstrap is not limited to the SCT renew request. In fact, it will have a similar situation occur during the bootstrap, and can have the following race conditions: 1) the client uses an old version of the SCT, or 2) out-of-sync on both the client side and the server side. When the bootstrap needs to go to remote STS to get the SAML token, the window is larger and it will have a greater chance of running into race conditions.

In FIG. 3I, the client 105 uses on old version of the SCT. In this situation, the client 105 uses the SCT version 0 (SCT0) to protect the message after the first bootstrap message, but the server 115 already has advanced to version 1 of the SCT (SCT1) from another bootstrap message. The server 115 is unable to decrypt and verify the message from the client 105.

At point 7-11, the application on the client 105 sends a request to the application on the server 115, and WS-SC client 110 receives the request. The WS-SC client 110 sends a request message to remote SAML STS 205 (which is a WS-Trust RST message), that uses client credential to exchange SAML token (point 8-11). At point 9-11, the SAML STS 205 verifies the credential and issues the SAML token in its response (which is a WS-Trust RSTR message). At point 10-11, the WS-SC client 110 receives the SAML token on RSTR from remote SAML STS 205, uses it on the bootstrap message, and sends the message to the STS 125. Again, this is a WS-Trust RST message that uses SAML token to exchange SCT.

At point 11-11, the STS 125 verifies the credential and sends back the SCT. This is a WS-Trust RSTR message and the SCT is version 0 (SCT0). The STS 125 also stores the SCT0. At point 12-11, the WS-SC client 110 will use SCT0 to protect the request message and sends the message. After message at point 3-11 and before message from point 5-11 arrive, the application on the client 105 sends another request to server 115 (point 13-11). At point 14-11, the WS-SC client 110 checks and determines that no SCT is stored, because a message from point 5-11 has not yet arrived. Therefore, the WS-SC client 110 sends a bootstrap message to the STS 125. The client 105 further finds that SAML token for authentication is required for bootstrap, but it just received the SAML token from remote SAML STS 205. The client 105 sends a WS-SC bootstrap request message to STS 125, which is a WS-Trust RST message that uses SAML token to exchange SCT.

At point 15-11, the STS 125 verifies the credential, sends back the SCT (SCT1), and updates the stored SCT from SCT0 to SCT1. Then, when the message at point 6-11 has arrived to the WS-SC server 120, the message was protected by SCT0, but now the server has SCT1, and the server 115 is unable to handle this message.

Figure 3J:
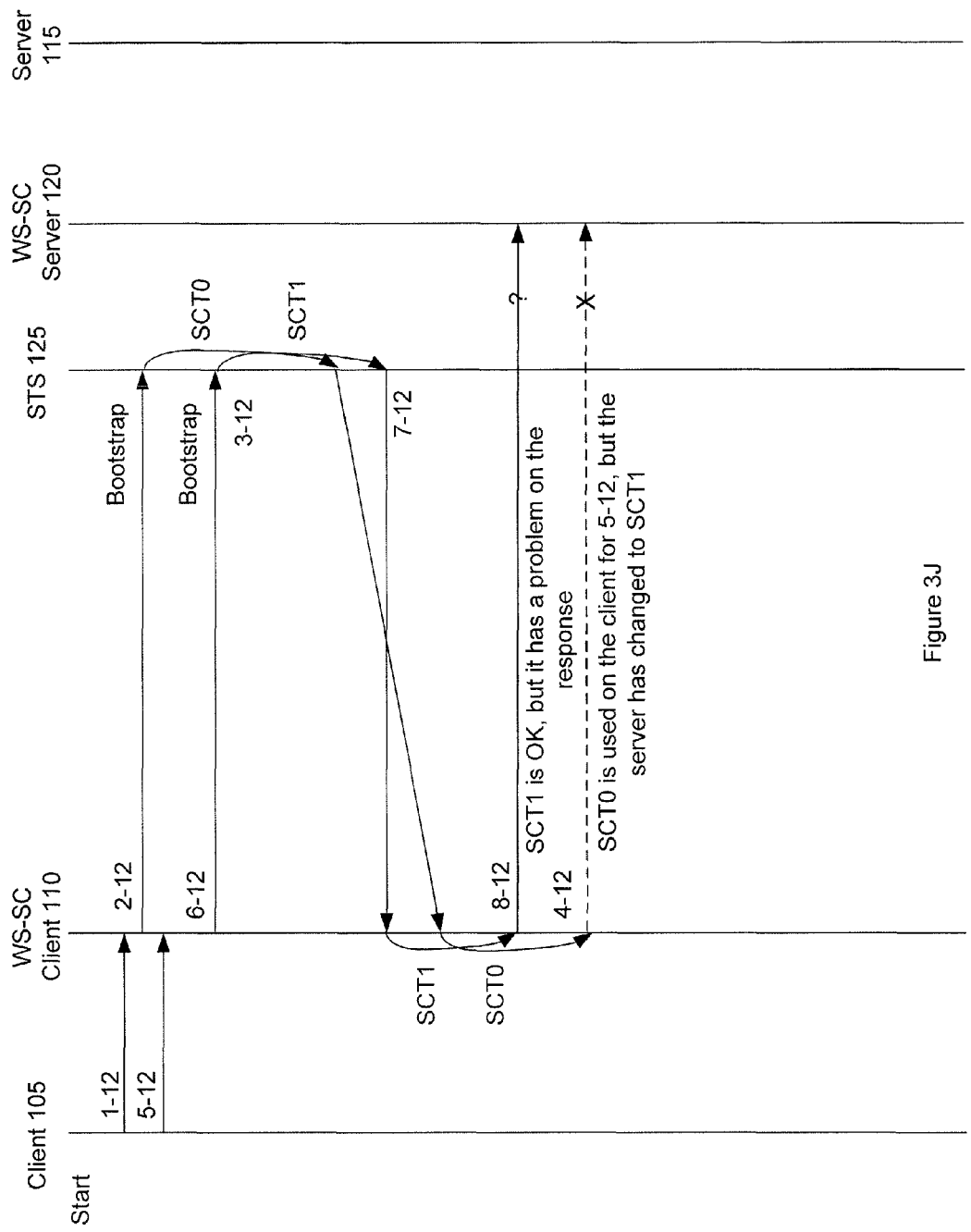

In FIG. 3J the out-of-sync race condition is described. The out-of-sync race condition may occur in the bootstrap WS-Trust message. In this situation, two bootstrap messages are sent at a close interval. If the first SCT comes back later then the second SCT, then the client 105 will have a different version of SCT from that of the server 115. When this SCT out-of-sync situation occurs, the conversations between the client 105 and the server 115 will fail and are unable to recover.

At point 1-12, the application on the client 105 sends a request to the application on the server 115, and the WS-SC client 110 receives the request. Then, at point 2-12, the WS-SC client sends the bootstrap message to the STS 125 to request SCT. The STS 125 verifies the credential and sends back the SCT (point 3-12). This is a WS-Trust RSTR message, and the SCT is version 0 (SCT0). The STS 125 updates the stored SCT to SCT0.

At point 4-12, the WS-SC client 110 uses SCT0 to protect the request message (however, the server 115 is expecting SCT1, see below). At point 5-12, following the message at point 1-12, the application on the client 105 sends another request to server 115. at point 6-12, the WS-SC client 110 checks and determines that no SCT is stored, because the message from point 3-12 have not yet arrived, so the WS-SC client 110 needs to send another bootstrap message to the STS 125 to request an SCT. Since the STS 125 has already sent SCT0 to WS-SC client 110, at point 7-12, the issues the SCT version 1 (SCT1), updates the stored SCT from SCT0 to SCT1, and sends the SCT1 back to WS-SC client 110. The message on this point 7-12 travels faster it gets to the WS-SC client 110 before the message from point 3-12.

As such, the client saves the SCT as SCT1. Thus, at point 8-12, the WS-SC client 110 sends a request message to the WS-SC server 120 using the SCT1 to protect the message. The message from point 3-12 comes later then message from point 7-12. When the message from point 3-12 arrives, the client 105 will update the stored SCT with SCT0. This will override the SCT1 that was received from the message from point 7-12. Now, the client has SCT0, but server has SCT1. The SCT out-of-sync condition has been established.

Further, the message from point 4-12 is protected with the SCT just arrived from the message at point 3-12 (i.e., SCT0); however, the most current SCT on server 115 is SCT1. The server 115 is unable to handle the message sent from point 4-12, due to the SCT out-of-sync situation. Also, the request message from point 8-12 is protected by SCT1. This matches the version of SCT on the server 115, and the server 115 is able to handle the request message from point 8-11; however, the response from this request will be protected by SCT1 and the client has SCT0. Therefore, the client will not be able to handle any response messages from the server 115 due to this SCT out-of-sync condition.

aspects of the present invention include solving the error situations described above in FIGS. 3A-3J. In one embodiment, a proactive SCT renew schema may be used to send the SCT renew request before it expires and use a sliding window approach to determine when the renew request should be sent. Further, a change SCT on response when the server determines to send the response back to client, if the SCT is expired, the new unexpired SCT should be used instead. The SCT persistence on both the server side and the client side should be changed to accommodate this feature.

additionally, to prevent race conditions when the SCT is changed to latest SCT on conversation response by making the latest SCT available for response protection after the renew response has delivered to the WS-SC client successfully and the acknowledgement has received on the WS-SC server. Also, a new option to check the SCT expiration to provide three options to check the SCT expiration time, from STRICT to LAX. Automatically canceling the SCT, if the session is inactive and goes beyond the predefined timeout period, and there is no outstanding response messages.

Furthermore, block the next bootstrap option which allows only one bootstrap message and disallows multiple bootstrap SCT request messages. Also, versioning of the SCT key when the SCT ID is not changed. The combination of these changes provide remedies for the error conditions described above.

Figure 4A:
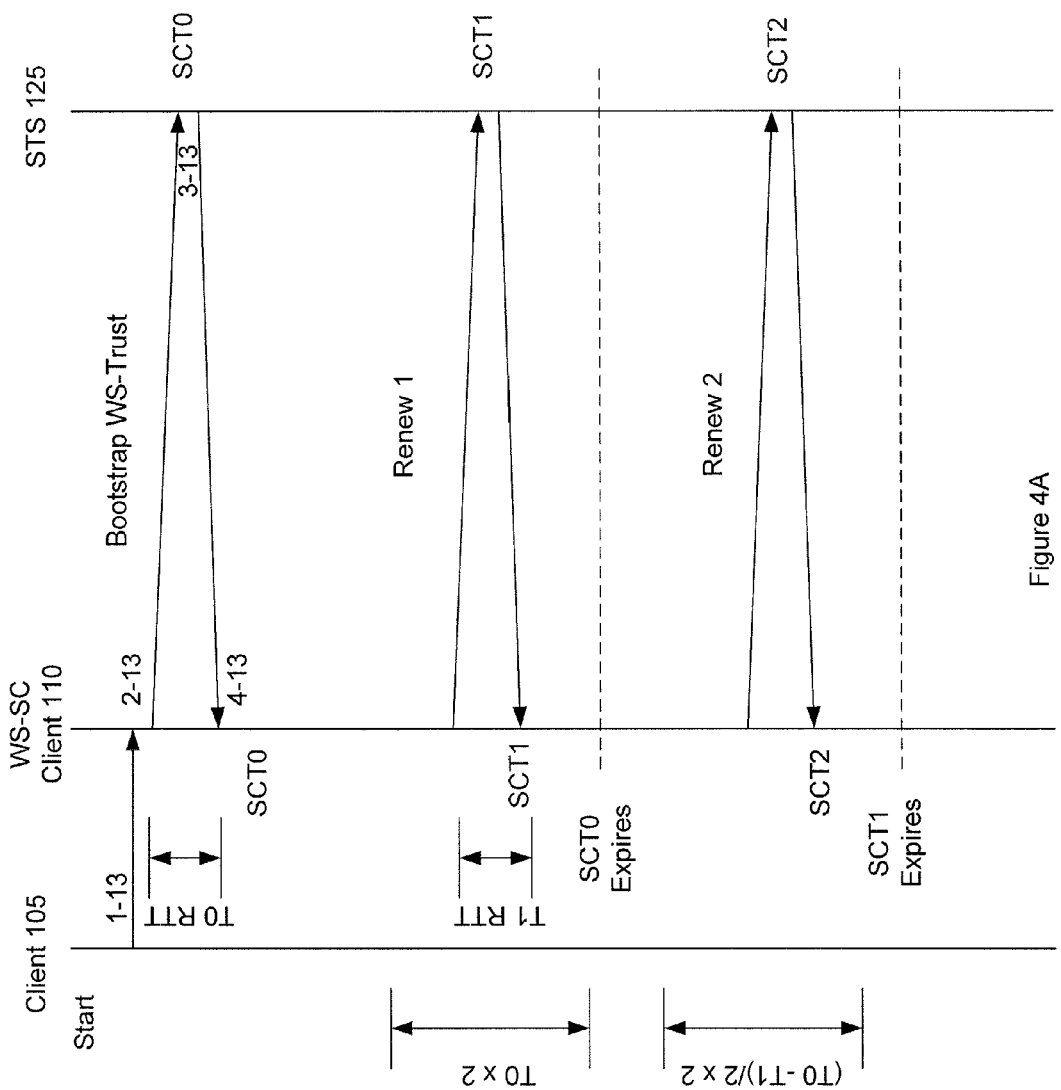
FIG. 4A is a time-flow diagram describing aspects of the present invention.

Turning now to FIG. 4A, which illustrates one aspect of a proactive SCT renew method, in accordance with aspects of the present invention. In general, the SCT renew is in a "Reactive mode" (or reactive process), that is the SCT renew request is a reaction to the application request and the request detects the SCT is expired. The present invention provides for a configuration for changing the SCT renewal into a "Proactive mode" (or preventative process).

In proactive mode, instead of sending the SCT renew request when the SCT is expired, the SCt renew request will be sent prior to the expiration of the SCT. When client 105 receive the SCT from STS 125, the client 105 can find the SCT expiration time from the lifetime element of the SCT and base on the expiration time, the next SCT renew request can be scheduled. When scheduling the client 105 may add additional time to the round trip time before the current SCT expiration for the next SCT renew request. Then, the SCT renew request can be scheduled to start from the first SCT arrival to the client 105, by using, for example, the following formula: ST=SCTexp−Tavg×C, where: ST: the time to send next SCT renew request, SCTexp: the expiration time in the SCT, which is the wst:Lifetime/wsu:Expires element in SCT, Tavg: the average round trip travel time for WS-Trust renew request, the first Tavg will equal to the round trip time for the bootstrap, and C: a constant value between, for example, 1.5 to 2.0 (for ensuring the SCT travels to the server will not expire, and still have time to travel back to client).

FIG. 4A illustrates a time-sequence diagram for determining the next schedule time of the proactive mode SCT renew. At point 1-13, a request from the application on client 105 is sent to the server 115. At point 2-13, the WS-SC client 110 receives the request and sends a bootstrap WS-trust request the STS 125. Accordingly, at point 3-13, the STS 125 response to the WS-trust request with SCT0. Then, at point 4-13, the RTT for receiving the SCT0 is calculated (i.e., T0).

Subsequently, after T0×2 passes a second WS-Trust bootstrap request is sent to renew the SCT to SCT1, prior to the expiration of SCT0. As such, the SCT is renewed to SCT1, and then SCT0 expires. Furthermore, the RTT for the renewal of SCT1 of calculated (i.e., T1). Then, a WS-trust bootstrap request is sent after (T0−T1)/2×2. Accordingly, the SCT is renewed to SCT2 prior to the expiration of SCT1. Therefore, the SCTs are proactively renewed prior to the expiration of the previous SCT. This process avoids any of the race conditions and maintains synchronized SCTs are the client and server sides. Further, this process closes the window of sending multiple SCT renew requests, as there should always have an unexpired SCT on both client and server sides. The error condition of multiple SCT renewal requests, described above, is prevented.

Figure 4B:
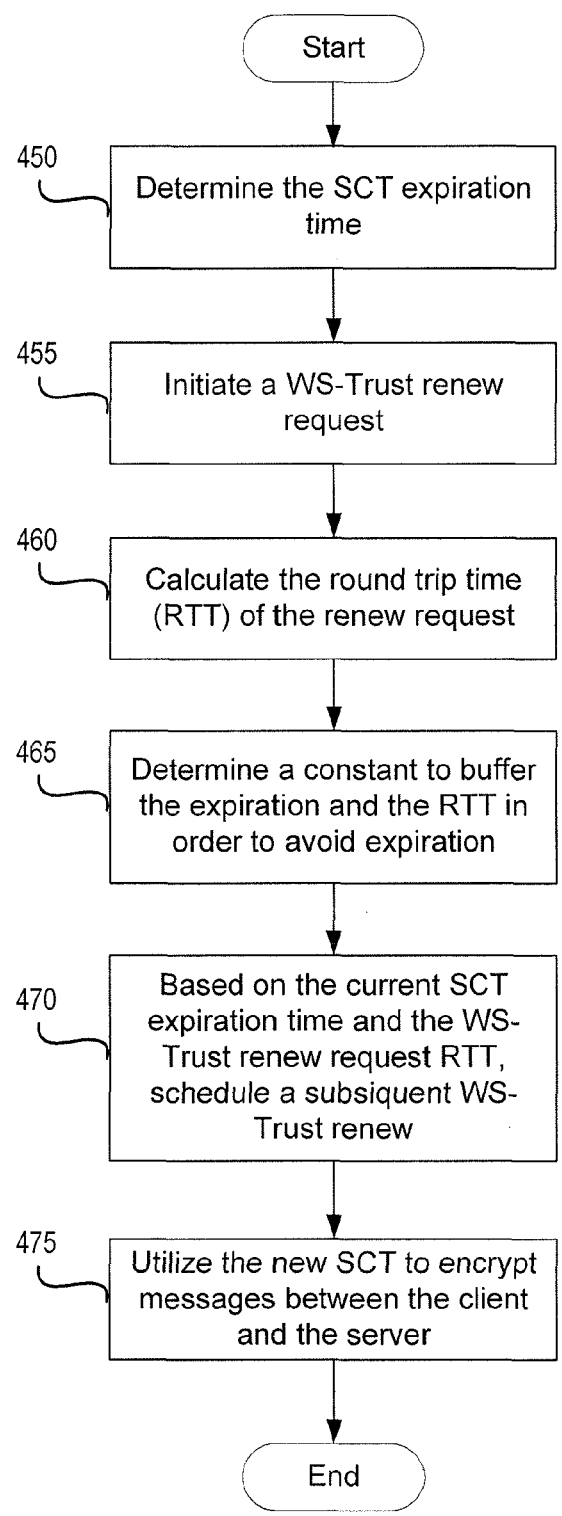
FIG. 4B is a flow diagram describing aspects of the present invention.

Turning now to FIG. 4B, which illustrates a method for determining the next schedule time of the proactive mode SCT renew. At process block 450, a determination is made for the SCT expiration time. A WS-Trust renew request is initiated (process block 455). At process block 460, the RTT of the renew request is calculated. A constant is determined to buffer the expiration time and the RTT, in order to avoid expiration prior to renew (process block 465).

At process block 470, based on the current SCt expiration time and the WS-Trust renew request RTT, a subsequent WS-Trust renew is scheduled. Then, at process block 475, the new SCT is utilized to encrypt messages between the client and the server, until the preemptive time interval has expired. Then, a subsequent proactive WS-Trust renew is send (this process continues until the session is ended).

Figure 5:
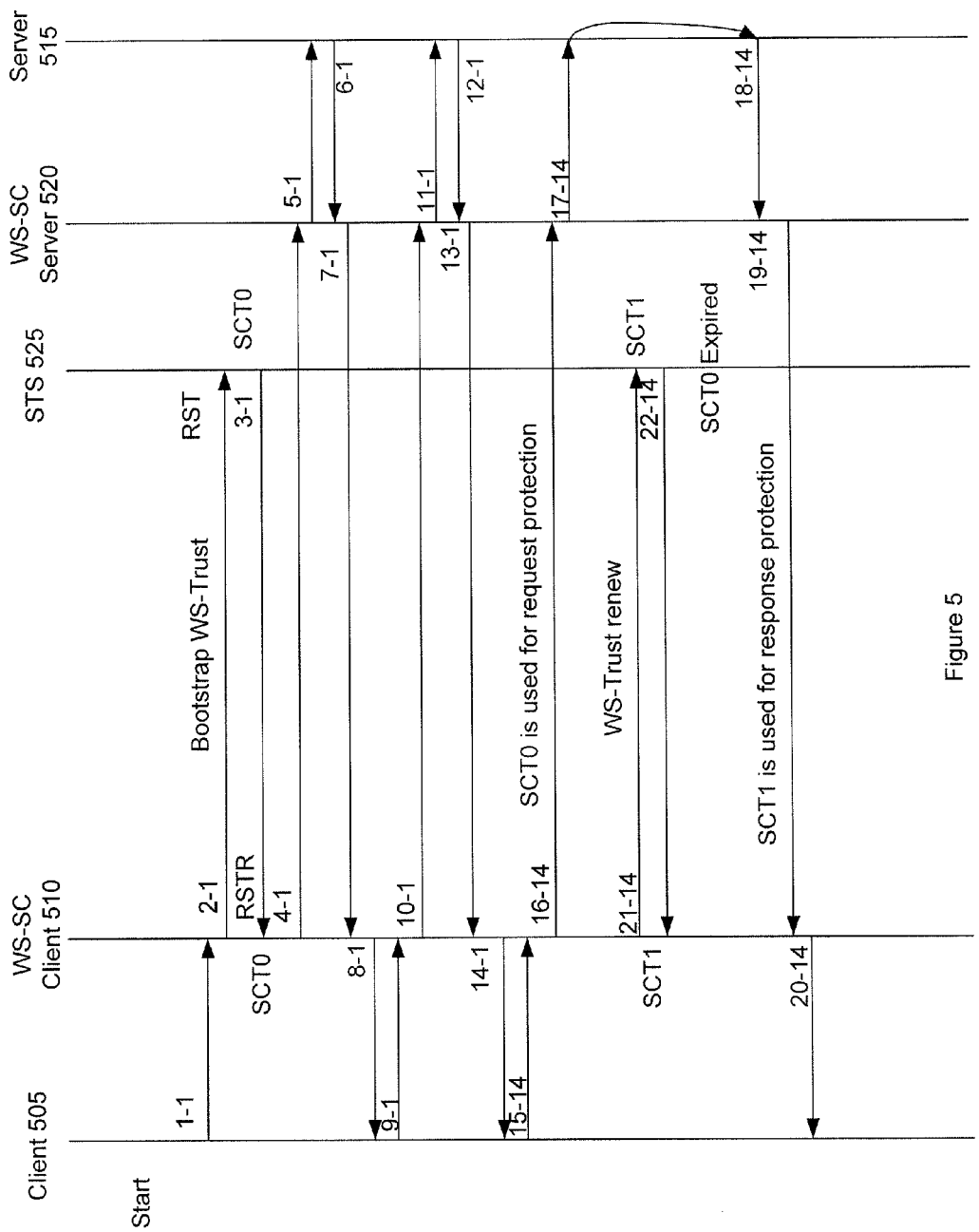
FIG. 5 is a time-flow diagram describing aspects of the present invention.

Turning now to FIG. 5, which illustrates a change SCT on a response, which is a solution which addresses the error condition when the server SCT is expired. When the WS-SC server 520 is ready to send the response back to the client 505, it will retrieve the old SCT on the message context and use it to protect the response message. If the old SCT is expired at that time, then the server 515 will get the latest SCT for that client 505 and use it to protect the response message instead. Note that the latest SCT might not be received by client 505. The response arrives to client 505 prior to the latest RSTR, then this will create a race condition. The prevention of this race condition will achieved by making the SCT available on the server 515 after the response of the WS-Trust renew request is successfully sent to the WS-SC client 510.

One example of the logic for getting SCT on the WS-SC server 520 for the conversation response message protection will be changed. Instead, to get the SCT from the message context, the following logic may be implemented:

```
Get the old SCT from the message context
If the SCT is not expired {
    Use this old SCT for message protection
} else {
    Get the most current SCT on this client by using old SCT Id
    If no unexpired SCT found {
        Use the old SCT for message protection
    } else {
        Use the new SCT for message protection
    }
}
```

This is to account for both the new client that will send the renew request ahead of time, and the old version of client or client from other vendors or other implementations. With the above change logic of the SCT on response message, the new message flow is illustrated on the following time-sequence diagram of FIG. 5. With regard to FIG. 5, it should be noted that points 1-1 through 14-1 operate in the same or similar manner to points 1-1 through 20-1 in FIG. 1C (described above). As such, the description of FIG. 5 will begin at point 15-14.

At point 15-14, the application at the client 505 sends another request to the server 515. At point 16-14, the WS-SC client 510 checks and finds the SCT (SCT0) using the method of, for example, getSct( ), inserts the SCT0 on the message context, and uses SCT0 to protect the message. At point 17-14, the WS-SC server 520 retrieves the SCT0 from the SCT persistence using the method of, for example, getSctBy-SctId( ), inserts the SCT onto message context, uses the SCT to decrypt the message and verify the signature, and then sends the SCT to the application on the server 515.

At point 18-14, the application on the server 515 processes the request and generates the response payload. This step takes time to complete and it happens after SCT0 has expired, also after message at point 22-14, when the new SCT1 is saved on the server 515. As such, at point 19-14, the WS-SC server 520 detects that the SCT on the message context has expired, and uses the new logic described in this section (above) to determine which SCT to be used to protect the message, and then sends back a secured response. The method of, for example, getSctByOldSctId( ) may be used to retrieve the unexpired SCT on the server 515 for this client 505.

At point 20-14, the WS-SC client 510 receives the message, detects that the SCT ID on the message header is not the same as in its message context, then the client retrieves the SCT1 from the SCT persistence by using the method of, for example, getSctBySctId( ), uses this SCT1 to decrypt the message and verify the signature, and then sends the response payload back to the application. At point 21-14, independent of above message flow, the message at point 21-14 is a scheduled task on the WS-SC client 510. The WS-Trust RST for SCT renew message is sent before the SCT0 is expired, and the RST message is protected by SCT0.

At point 22-14, the WS-SC server 520 generates a new SCT (SCT1), inserts it onto the WS-Trust RSTR message, and sends it back to the WS-SC client 510. After the message is successfully sent, it then saves the SCT1 by its SCT ID, and also saves SCT1's old SCT ID, which is SCT0's ID. Using this order of send then save avoids the race condition of SCT, where message at point 19-14 travels faster then message on at point 22-14, and is then unable to retrieve SCT1 on the client 505. Further, at point 23-14, the WS-SC client 510 saves the SCT1 by the SCT ID, and keeps it as the most recent SCT for future use. It will also schedule the next renewal request before SCT1 expiration.

In a further embodiment, SCT persistence on server may be maintained using the two methods: 1) getSctBySctId( )—Use SCT id (wsc:SecurityContextToken/wsc:Identifier) to retrieve the SCT value from the persistence, and 2) getSctByOldSctId( )—Need to retrieve the most recent unexpired SCT for a given client. Further, the SCT ID is from the incoming WS-SC conversation request message. Each time, any client sends the WS-Trust renew request, the server can insert the newly generated SCT entry into the set. The old SCT ID for this SCT needs to be included in the entry so that the most recent unexpired SCT for a given client can be retrieved.

SCT persistence on client may be maintained by implementing the following methods on the server side: 1) getSctBySctId( )—Use SCT ID (wsc:SecurityContextToken/wsc:Identifier) to retrieve the SCT value from the persistence, and 2) getSctByOldSctId( )—Need to retrieve the most recent SCT for this client. A new persistence set on the client may be needed to implement this method. This set of SCT will be used to retrieve the SCT value by the SCT ID. The SCT ID is from the incoming WS-SC conversation response message. Each time, the client gets a new SCT from the WS-Trust renew response (RSTR), the client may insert the newly received SCT into this set.

The entry of the latest SCT will be kept in this set so that the most recent SCT can be retrieved. This SCT may be used for protecting the out going conversation request message. To reuse the same implementation on the server side, the same API may be used for getting most recent SCT.

In a further embodiment, the sending of the renew request when SCT is expired, may be implemented. If the SCT is expired then the client initiates the WS-Trust message to request a new SCT. With the proactive SCT renewal approach, the most current SCT should be unexpired. This is just in case for the error condition when the pre-renew SCT request goes astray, and the SCT is not up-to-date automatically.

Instead of simply rejecting the SCT if it is already expired from the incoming messages, the addition of the new configuration constant for checking SCT expiration on the client side. This constant, for example, checking SCT.expiration, may have the following three values: STRICT, TOLERANT, or LAX. In one embodiment, the default value may be TOLERANT. The STRICT option may be used in the same simple rule to check the SCT expiration. That is, if the expires time in SCT past the current time, the message will be rejected. This is the most secure approach.

The TOLERANT option may allow the SCT to pass the current time with a small tolerance window. The client knows the last SCT token on the server side, and its expiration time. It also knows the one way travel time for the message sent from the server to the client. With these two values, the tolerance window can be calculated, and the SCT expiration check can take the tolerance into account.

Furthermore, the LAX option may not check the expiration on the SCT, if it is the same SCT used in the request message protection. This is a least secure option, but can maintain the backward compatibility for the server is running old version of WLS or other vendors' implementation. The error condition of SCT is expired upon arrival, as is described above, is prevented by when configured with the TOLERANT or the LAX option.

A further embodiment of the present invention includes an automatically cancel implementation. The system should cancel the inactive conversation session automatically so that the system will not hold up unnecessary resource and will not cause a memory leak condition. However, the system needs to prevent the situation of outstanding late responses that arrive after the SCT is cancelled. The SCT stored needs to keep track the following two things: 1) outstanding responses that have not yet come back from server, and 2) inactive time of using the SCT for conversation request message. If the SCT has not been used for preconfigured (e.g., SCT_TIMEOUT_PERIOR), and there is no outstanding response messages, then instead of renew the SCT, the client should send the cancel request to cancel the SCT for both sides.

Furthermore, once the bootstrap message is sent, and before the client receives the new SCT, all of the subsequence application requests that require the bootstrap may be blocked. This is to prevent the multiple bootstraps error condition, as is described in, for example, FIG. 3D. This also prevents the race conditions, as described in, for example, FIGS. 3F and 3G. At the time of bootstrap, there is no way to detect the server behavior whether the SCT ID is changed or not on a rekey.

According to a further embodiment of the invention, multiple versions of the secret keys may be maintained. This solution is used in the case where the SCT ID is not changed when the secret key is re-keyed. This situation where no SCT ID is changed may not be a default behavior and this solution is optional and may be turned on by a configuration flag. The configuration flag of, for example, SCT_ID_CHANGE_ON_REKERY may be introduced for both the client and the server sides and the default value is "true". That is, if no setting or the flag is set to true, then it will use the default behavior and change to new SCT ID each time the secrete key is rekeyed. When the SCT_ID_CHANGE_ON_REKERY=false on the server side, the SCT ID will remain to a constant in the lifetime of the conversation, and keeping multiple version of secret keys to avoid the race conditions is required.

For the client side, whether the SCT ID is changed or not can be detected automatically by examining the RSTR message on the renew SCT request. If the SCT ID remains unchanged after the SCT renew, then the situation is that of no SCT ID changed after re-key, and keeping multiple version of secret keys to avoid the race conditions is desirable. By automatically detecting the server behavior features, the same client can automatically work with our server and the server from, for example, other vendors that have different SCT ID behavior, without the need of setting different flag for different server. This will increase the interoperability of the WS-SC client.

In one embodiment, the logic of saving multiple version of secrete keys on the client side may be:

```
IF the renew RSTR indicates that the secrete key is
changed from the previous SCT but the SCT ID is not
changed THEN
    Save the previous SCT and the newly received SCT
in time sequence
        Set the SCT_ID_CHANGE_ON_REKERY flag to
false.
```

For outgoing conversation request message, always use most current SCT to protect the message. For incoming conversation response message:

```
IF SCT_ID_CHANGE_ON_REKERY =
false THEN,
    TRY to use the most current SCT to decrypt
the message and verify the signature. IF found the most
current SCT is a wrong key for decryption or signature
verification, THEN
        TRY with the next secrete key
        UTIL all unexpired SCT are tested
        IF the SCT is always expired THEN delete
from the list (unless the Checking.SCT.expiration value is
LAX)
        IF all available secrete keys have been tried
and no match key found THEN throw error exception.
```

The logic of saving multiple versions of the secret keys on the server side is similar to that of the client side, with the following exceptions: 1) determining to turn on the secrete key versioning, and to re-key the SCT without changing the SCT ID by SCT_ID_CHANGE_ON_REKERY configuration, and 2) no Checking.SCT.expiration configuration on the server. The server side will delete expired SCT, unless it is the only one in the list.

Figure 6A:
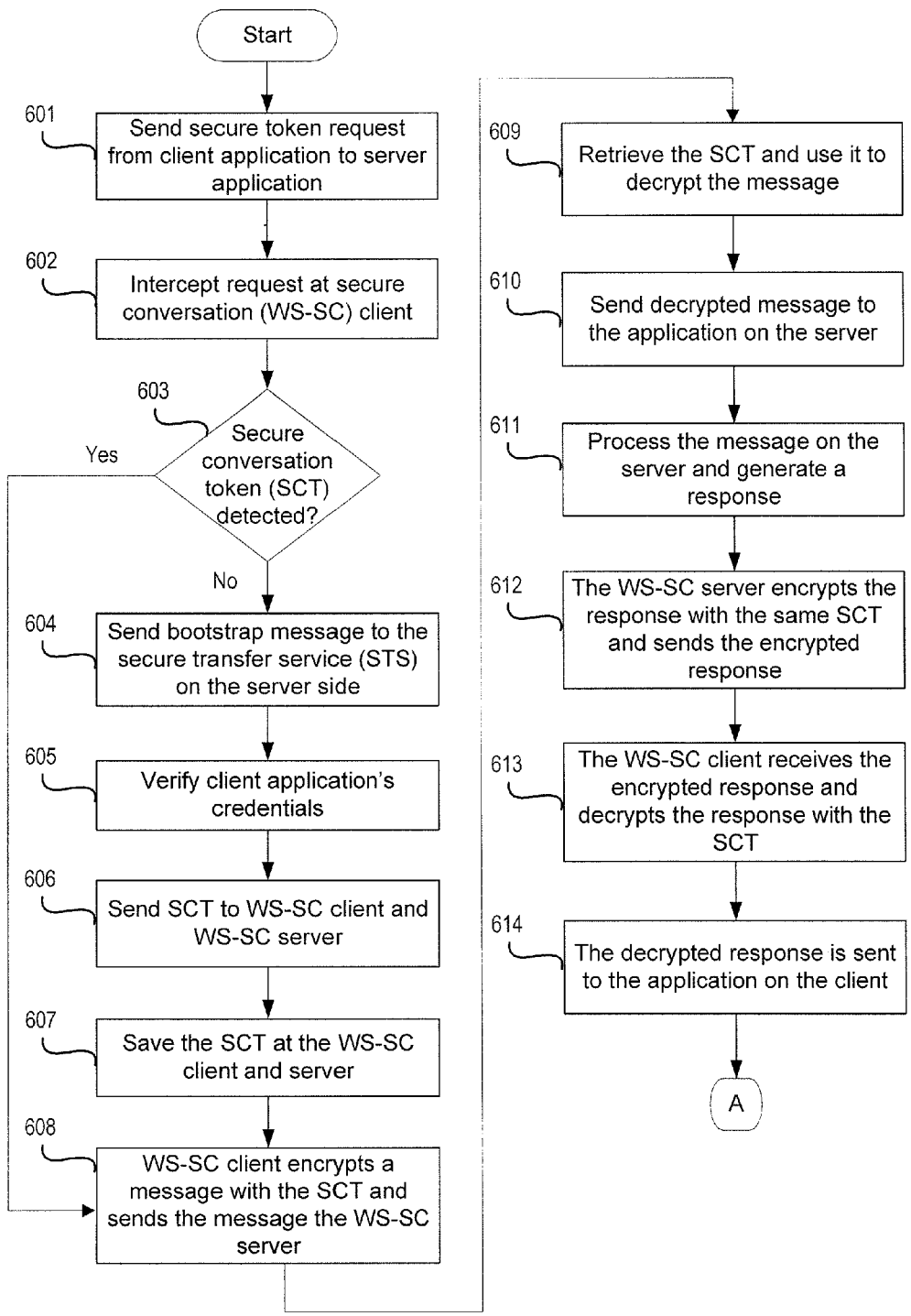
FIGS. 6A and 6B are flow diagrams describing aspects of the present invention.
Figure 6B:
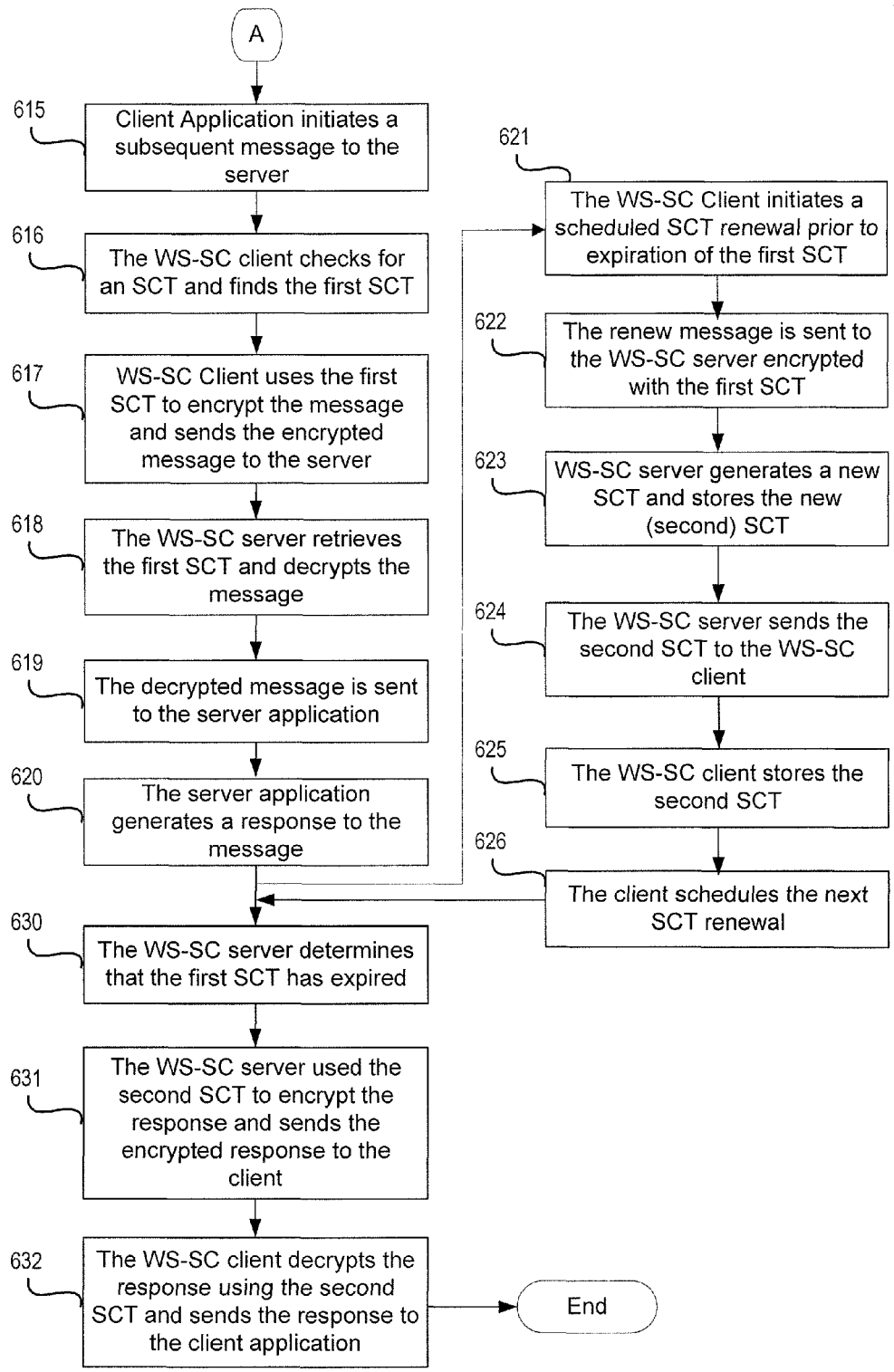

Turning now to FIGS. 6A and 6B, which illustrate a method in accordance with the present invention. At process block 601, a secure token request is sent from the client application to the server application. At process block 602, the request is intercepted at the secure conversation (WS-SC) client. A determination is then made whether the secure conversation token (SCT) has been detected (decision block 603).

At process block 604, a bootstrap message is sent to the secure transfer service (STS) on the server side, and then the client application's credentials are verified (process block 605). At process block 606, the SCT is sent to the WS-SC client and the WS-SC server. Accordingly, the SCT is saved at the WS-SC client and server (process block 607). At process block 608, the WS-SC client encrypts a message with the SCT and sends the message the WS-SC server.

At process block 609, the CST is retrieved and used to decrypt the message, the decrypted message is then sent to the application on the server (process block 610). At process block 611, the message is processed on the server and a response is generated. The WS-SC server encrypts the response with the same SCT and sends the encrypted response (process block 612).

Furthermore, the WS-SC client receives the encrypted response and decrypts the response with the SCT (process block 613). The decrypted response is then sent to the application on the client (process block 614) an the method continues to point A in FIG. 6B.

Referring now to FIG. 6B, from point A, at process block 615, the client application initiates a subsequent message to the server and then the WS-SC client checks for an SCT and finds the first SCT (process block 616). At process block 617, the WS-SC client uses the first SCT to encrypt the message and sends the encrypted message to the server.

Further, the WS-SC server retrieves the first SCT and decrypts the message (process block 618). At process block 619, the decrypted message is sent to the server application and then the server application generates a response to the message (process block 620). The WS-SC Client initiates a scheduled SCT renewal prior to expiration of the first SCT (process block 621).

At process block 622, the renew message is sent to the WS-SC server encrypted with the first SCT, and then the WS-SC server generates a new SCT and stores the new (second) SCT (process block 623). At process block 624, the WS-SC server sends the second SCT to the WS-SC client and the WS-SC client stores the second SCT (process block 625). At process block 626, the client schedules the next SCT renewal.

The WS-SC server determines that the first SCT has expired (process block 630), and then at process block 631, the WS-SC server used the second SCT to encrypt the response and sends the encrypted response to the client. At process block 632, the WS-SC client decrypts the response using the second SCT and sends the response to the client application.

Figure 7:
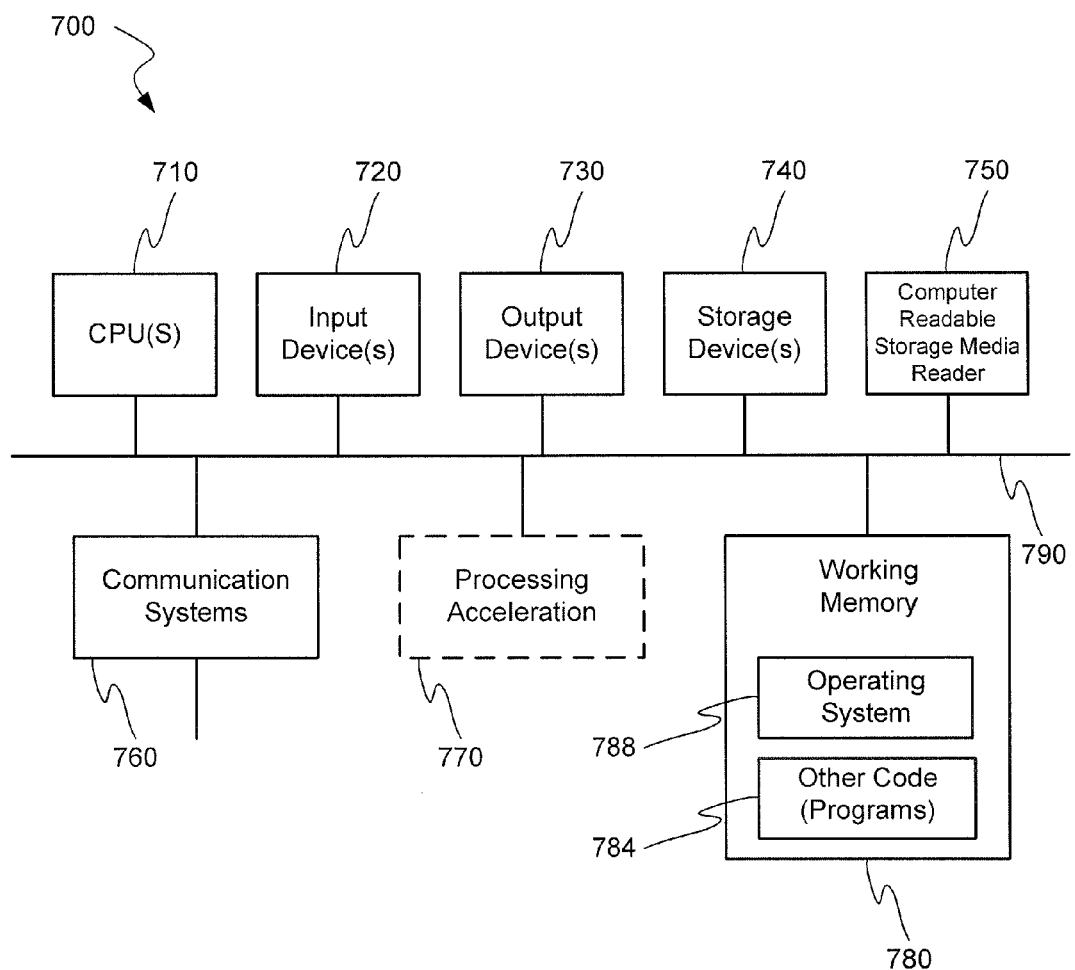
FIG. 7 is a block diagram of an exemplary computer system capable of being used in at least some portion of the apparatuses or systems of the present invention, or implementing at least some portion of the methods of the present invention.

FIG. 7 is a block diagram illustrating an exemplary computer system 700 in which embodiments of the present invention may be implemented. The computer system 00 is shown comprising hardware elements that may be electrically coupled via a bus 790. The hardware elements may include one or more central processing units 710, one or more input devices 720 (e.g., a mouse, a keyboard, etc.), and one or more output devices 730 (e.g., a display device, a printer, etc.). The computer system 700 may also include one or more storage device 740. By way of example, storage device(s) 740 may be disk drives, optical storage devices, solid-state storage device such as a random access memory ("RAM") and/or a read-only memory ("ROM"), which can be programmable, flash-updateable and/or the like.

The computer system 700 may additionally include a computer-readable storage media reader 750, a communications system 760 (e.g., a modem, a network card (wireless or wired), an infra-red communication device, Bluetooth™ device, cellular communication device, etc.), and working memory 780, which may include RAM and ROM devices as described above. In some embodiments, the computer system 700 may also include a processing acceleration unit 770, which can include a digital signal processor, a special-purpose processor and/or the like.

The computer-readable storage media reader 750 can further be connected to a computer-readable storage medium, together (and, optionally, in combination with storage device(s) 740) comprehensively representing remote, local, fixed, and/or removable storage devices plus storage media for temporarily and/or more permanently containing computer-readable information. The communications system 760 may permit data to be exchanged with a network, system, computer and/or other component described above.

The computer system 700 may also comprise software elements, shown as being currently located within a working memory 780, including an operating system 784 and/or other code 788. It should be appreciated that alternate embodiments of a computer system 700 may have numerous variations from that described above. For example, customized hardware might also be used and/or particular elements might be implemented in hardware, software (including portable software, such as applets), or both. Furthermore, connection to other computing devices such as network input/output and data acquisition devices may also occur.

Software of computer system 700 may include code 788 for implementing any or all of the function of the various elements of the architecture as described herein. For example, software, stored on and/or executed by a computer system such as system 700, can provide the functionality and/or other components of the invention such as those discussed above. Methods implementable by software on some of these components have been discussed above in more detail.

The invention has now been described in detail for the purposes of clarity and understanding. However, it will be appreciated that certain changes and modifications may be practiced within the scope of the appended claims.

What is claimed is:

1. A method of implementing proactive token renewal and management in secure conversations, the method comprising:
   transmitting a first secure conversation token (SCT) request;
   receiving a first SCT in response to the first SCT request;
   utilizing the first SCT in the secure conversation;
   determining a round trip time (RTT) of the first SCT request;
   determining an expiration time of the first SCT;
   scheduling a second SCT request, wherein the second SCT request is scheduled at a time at least one R TT time period prior to the determined expiration time of the first SCT and wherein the second SCT request is scheduled to provide an overlap between the expiration of the first SCT and the renewal of a second SCT;
   initiating the second SCT request at the scheduled time;
   receiving the second SCT in response to the second SCT request;
   continuing to utilize the first SCT in the secure conversation while the first SCT is unexpired;
   receiving an indication that the first SCT has expired; and
   in response to receiving the indication that the first SCT has expired, utilizing the second SCT in the secure conversation.

2. A method of implementing proactive token renewal and management in secure conversations as in claim 1, further comprising determining a constant to buffer the expiration and the RTT in order to avoid expiration of the first SCT.

3. A method of implementing proactive token renewal and management in secure conversations as in claim 1, wherein the utilizing of the second SCT comprises encrypting messages transmitted between a client and a server.

4. A method of implementing proactive token renewal and management in secure conversations as in claim 1, wherein the initiating of the second SCT request is configured to proactively request the second SCT prior to the expiration of the first SCT.

5. A method of implementing proactive token renewal and management in secure conversations as in claim 4, wherein at least one SCT is continuously unexpired.

6. The method of claim 1, further comprising multiplying the RTT by a factor value, wherein the factor value is configured to provide the overlap between the expiration of the first SCT and the renewal of the second SCT, and wherein the second SCT request is scheduled at least one RTT multiplied by the factor value prior to the expiration of the first SCT.

7. A system for implementing proactive token renewal and management in secure conversations, the system comprising:
   a memory device; and
   a processor in communication with the memory device, wherein the memory device includes sets of instructions stored thereon which, when executed by the processor, cause the processor to:
   transmit a first secure conversation token (SCT) request;
   receive a first SCT in response to the first SCT request;
   utilize the first SCT in the secure conversation;
   determine a round trip time (RTT) of the first SCT request;
   determine an expiration time of the first SCT;
   schedule a second SCT request, wherein the second SCT request is scheduled at a time at least one RTT time period prior to the determined expiration time of the first SCT and wherein the second SCT request is scheduled to provide an overlap between the expiration of the first SCT and the renewal of a second SCT;
   initiate the second SCT request at the scheduled time;
   receive the second SCT in response to the second SCT request;
   continue to utilize the first SCT in the secure conversation while the first SCT is unexpired;
   receive an indication that the first SCT has expired; and
   in response to receiving the indicating indication that the first SCT has expired, utilize the second SCT in the secure conversation.

8. A system for implementing proactive token renewal and management in secure conversations as in claim 7, wherein the sets of instructions when further executed by the processor cause the processor to determine a constant to buffer the expiration and the RTT in order to avoid expiration of the first SCT.

9. A system for implementing proactive token renewal and management in secure conversations as in claim 7, wherein the utilizing of the second SCT comprises encrypting messages transmitted between a client and a server.

10. A system for implementing proactive token renewal and management in secure conversations as in claim 7, wherein the initiating of the SCT request is configured to proactively request the second SCT prior to the expiration of the first SCT.

11. A system for implementing proactive token renewal and management in secure conversations as in claim 10, wherein at least one SCT is continuously unexpired.

12. The system of claim 7, wherein the instructions further cause the processor to multiply the RTT by a factor value, wherein the factor value is configured to provide the overlap between the expiration of the first SCT and the renewal of the second SCT, and wherein the second SCT request is scheduled at least one RTT multiplied by the factor value prior to the expiration of the first SCT.

13. A non-transitory computer-readable medium for implementing proactive token renewal and management in secure conversations, having sets of instructions stored thereon which, when executed by a computer, cause the computer to:
   transmit a first secure conversation token (SCT) request;
   receive a first SCT in response to the first SCT request;
   utilize the first SCT in the secure conversation;
   determine a round trip time (RTT) of the first SCT request;
   determine an expiration time of the first SCT;
   schedule a second SCT request, wherein the second SCT request is scheduled at a time at least one RTT time period prior to the determined expiration time of the first SCT and wherein the second SCT request is scheduled to provide an overlap between the expiration of the first SCT and the renewal of a second SCT;
   initiate the second SCT request at the scheduled time;
   receive the second SCT in response to the second SCT request;
   continue to utilize the first SCT in the secure conversation while the first SCT is unexpired;
   receive an indication that the first SCT has expired; and
   in response to receiving the indicating indication that the first SCT has expired, utilize the second SCT in the secure conversation.

14. A non-transitory computer-readable medium for implementing proactive token renewal and management in secure conversations as in claim 13, wherein the sets of instruction when further executed by the computer, cause the computer to:
determine a constant to buffer the expiration and the RTT in order to avoid
expiration of the first SCT.

15. A non-transitory computer-readable medium for implementing proactive token renewal and management in secure conversations as in claim 13, wherein the utilizing of the second SCT comprises encrypting messages transmitted between a client and a server.

16. A non-transitory computer-readable medium for implementing proactive token renewal and management in secure conversations as in claim 13, wherein the initiating of the second SCT request is configured to proactively request the second SCT prior to the expiration of the first SCT.

17. A non-transitory computer-readable medium for implementing proactive token renewal and management in secure conversations as in claim 13, wherein at least one SCT is continuously unexpired.

18. The non-transitory computer-readable medium of claim 13, wherein the instructions further cause the processor to multiply the RTT by a factor value, wherein the factor value is configured to provide the overlap between the expiration of the first SCT and the renewal of the second SCT, and wherein the second SCT request is scheduled at least one RTT multiplied by the factor value prior to the expiration of the first SCT.

* * * * *